United States Patent
Matsumoto et al.

(10) Patent No.: US 8,223,766 B2
(45) Date of Patent: Jul. 17, 2012

(54) COMMUNICATION METHOD FOR SYSTEM INCLUDING CLIENT DEVICE AND PLURAL SERVER DEVICES

(75) Inventors: Tsuyoshi Matsumoto, Kawasaki (JP);
Takeshi Yamazaki, Kawasaki (JP);
Mako Kawaguchi, Kawasaki (JP);
Shuichi Kitaguchi, Kawasaki (JP);
Yuusuke Shimada, Kawasaki (JP);
Kotaro Okazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 225 days.

(21) Appl. No.: 12/543,216

(22) Filed: Aug. 18, 2009

(65) Prior Publication Data

US 2010/0014520 A1    Jan. 21, 2010

Related U.S. Application Data

(63) Continuation of application No. PCT/JP2007/000148, filed on Feb. 28, 2007.

(51) Int. Cl.
*H04L 12/28* (2006.01)
(52) U.S. Cl. ........................ 370/390; 713/151
(58) Field of Classification Search ............... 370/390; 713/151
See application file for complete search history.

(56) References Cited

U.S. PATENT DOCUMENTS

| | | | | |
|---|---|---|---|---|
| 5,260,933 | A * | 11/1993 | Rouse | 370/216 |
| 7,158,486 | B2 * | 1/2007 | Rhodes | 370/256 |
| 2002/0112152 | A1 * | 8/2002 | VanHeyningen et al. | 713/151 |
| 2003/0161296 | A1 * | 8/2003 | Butler et al. | 370/352 |
| 2006/0291452 | A1 * | 12/2006 | Velagaleti et al. | 370/352 |

FOREIGN PATENT DOCUMENTS

| | | |
|---|---|---|
| JP | A 2004-80070 | 3/2004 |
| JP | A 2004-120137 | 4/2004 |
| JP | 2005-33658 | 2/2005 |
| JP | A 2005-33658 | 2/2005 |

OTHER PUBLICATIONS

Hidetoshi Ueno, et al., "Multicast Technology for Broadcast-Type Data Delivery Service," NTT Gijutsu Journal, 2005 Nen 9 Gatsu Go, vol. 17, No. 9, Sep. 1, 2005, pp. 60 to 66.
Japanese Office Action issued in corresponding Japanese Application No. 2009-501034, mailed Jun. 14, 2011.

* cited by examiner

*Primary Examiner* — Robert Wilson
*Assistant Examiner* — Wei Zhao
(74) *Attorney, Agent, or Firm* — Greer, Burns & Crain, Ltd.

(57) ABSTRACT

An objective of the present invention is to secure the continuity of the communication between a client device and a standby server device, when a failure occurs and switch to the standby device is performed. A communication processing unit of the client device establishes connection with a plurality of server devices simultaneously by transmitting a UDP packet to the plurality of server devices by multicast. After establishing the connection, data of the application is transmitted by multicast to the plurality of the server devices. In the even of a failure, a standby server device receives the data packet multicast from the client device to continue the inter-application communication.

10 Claims, 24 Drawing Sheets

| | | ACK RESPONSE TRANSMITTER | | |
|---|---|---|---|---|
| | | ALL RESPONSE TRANSMITTERS (WAIT FOR ACK RETURN FROM ALL RESPONSE TRANSMITTERS) | ONE RESPONSE TRANSMITTER (WAIT FOR ACK FROM SPECIFIED RESPONSE TRANSMITTER) | 0 (NO WAITING FOR ACK RETURN FROM ALL RESPONSE TRANSMITTERS) |
| RETURN-TRANSMITTING LAYER | ACK CONFIRM INSTRUCTION GIVEN BY APPLICATION LAYER | Application-safe MODE | Application-quick MODE | nowait MODE |
| | AUTOMATIC ACK TRANSMISSION BY NETWORK LAYER | Network-safe MODE | Network-quick MODE | |

FIG. 4

[Active device]

| MULTICAST IP ADDRESS | PORT NUMBER | OPERATION MODE (TOTAL 5 PATTERNS) | ALREADY-RECEIVED SEQUENCE NUMBER WITH Quick MODE | ALREADY-RECEIVED SEQUENCE NUMBER WITH Safe MODE | STATUS | CLIENT IP ADDRESS | CLIENT PORT NUMBER |
|---|---|---|---|---|---|---|---|
| 224.0.0.1 | 5000 | App-safe | 1 | 2 | Active | 192.168.1.100 | 5000 |
| | | | | | | | |

41a (A)

[Standby device]

| MULTICAST IP ADDRESS | PORT NUMBER | OPERATION MODE (TOTAL 5 PATTERNS) | ALREADY-RECEIVED SEQUENCE NUMBER WITH Quick MODE | ALREADY-RECEIVED SEQUENCE NUMBER WITH Safe MODE | STATUS | CLIENT IP ADDRESS | CLIENT PORT NUMBER |
|---|---|---|---|---|---|---|---|
| 224.0.0.1 | 5000 | App-safe | 1 | 2 | Standby | 192.168.1.100 | 5000 |
| | | | | | | | |

41b (B)

F I G. 7

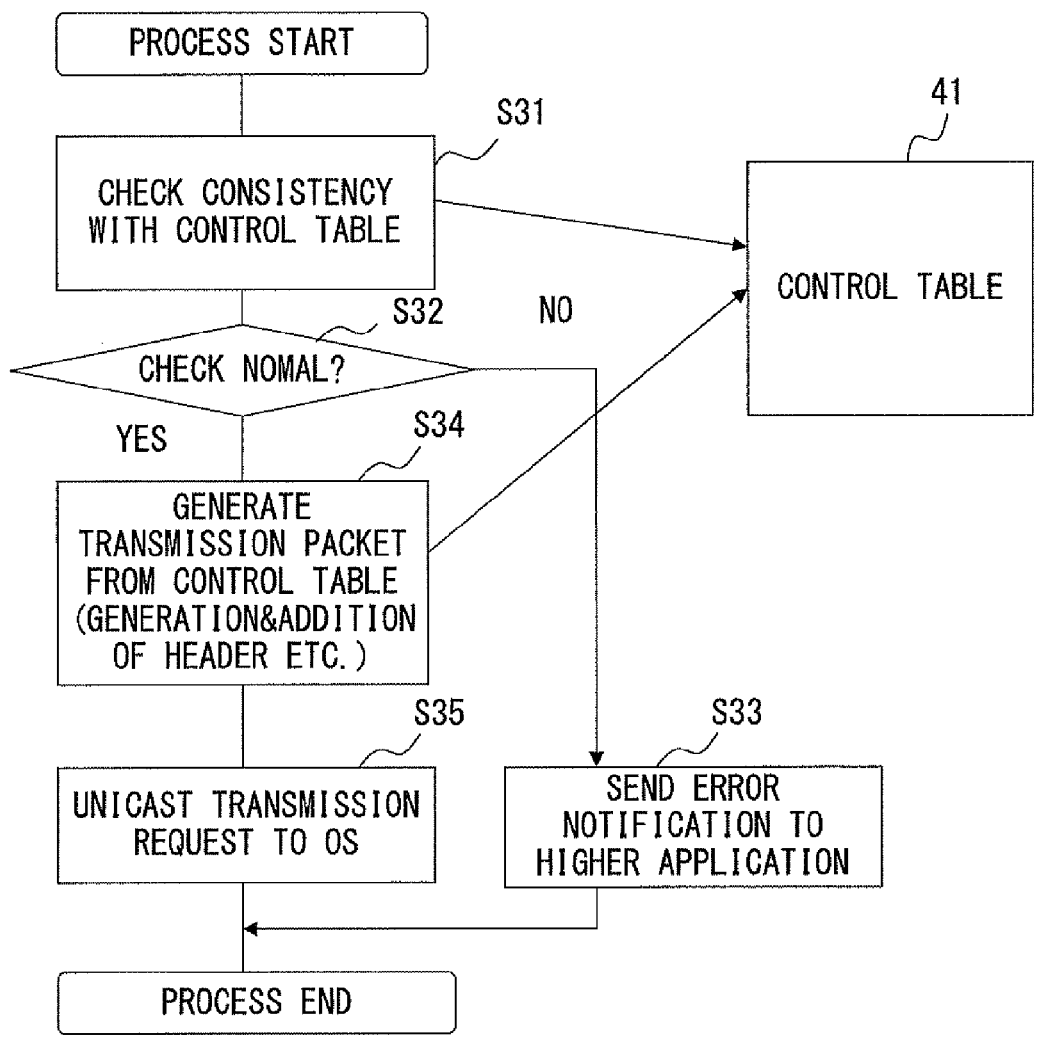
F I G. 8

[CONTROL TABLE] 42

| MULTICAST IP ADDRESS | 224.0.0.1 |
|---|---|
| PORT NUMBER | 5000 |
| INITIAL VALUE FOR PACKET RETRANSMISSION | 200 MILLI SECONDS |
| NUMBER OF PACKET RETRANSMISSION | 3 TIMES |
| MAXIMUM VALUE FOR PACKET RETRANSMISSION | 500 MILLI SECONDS |
| OPERATION MODE (TOTAL 5 MODES) | application-safe |
| ALREADY-TRANSSMITTED SEQUENCE NUMBER WITH Quick MODES | 100 |
| ALREADY-TRANSSMITTED SEQUENCE NUMBER WITH Safe MODES | 200 |
| RECIPIENT LIST  42a | |

(A)

[RECIPIENT LIST] 42a

| IP ADDRESS | STATUS 1 | STATUS 2 | ALREADY-RECEIVED ACK NUMBER WITH Quick MODES | ALREADY-RECEIVED ACK NUMBER WITH Safe MODES |
|---|---|---|---|---|
| 192.168.1.110 | Active | NORMAL | 100 | 199 |
| 192.168.1.120 | Standby | NORMAL | — | 199 |
| 192.168.1.130 | Standby | NORMAL | — | 199 |

| TCP-API NAME | API NAME IN EMBODIMENT | DESCRIPTION |
|---|---|---|
| socket() | pc_socket() | GENERATE SOCKET FOR HIGH-RELIABILITY MULTICAST |
| setsockopt() | pc_setsockopt() | PERFORM OPERATIONS SUCH AS SETTING OF TIMEOUT TIME, INITIAL SETTING/STATUS CHANGE OF RECIPIENT INSTANCE, SETTING OF DELIVERY CONFIRMATION METHOD FOR SPECIFIED SOCKET |
| getsockopt() | pc_getsockopt() | OBTAIN INFORMATION SUCH AS TIMEOUT TIME, STATUS OF RECIPIENT INSTANCE, DELIVERY, CONFIRMATION METHOD SET IN SPECIFIED SOCKET |
| bind() | pc_bind() | INSTRUCTS SOCKET FOR HIGH-RELIABILITY MULTICAST TO START RECEPTION |
| sendmsg() | pc_sendmsg() | TRANSMIT DATA TO RECIPIENT INSTANCE |
| recvmsg() | pc_recvmsg() | RECEIVE DATA |
| poll() | pc_poll() | WAIT UNTIL EVENT OF TRANSMISSION, RECEPTION OR ERROR OCCURS. ERROR RECOVERY WHEN SET TIMEOUT TIME IS OVER. |
| close() | pc_close() | COLLECTS SOCKET FOR HIGH-RELIABILITY MULTICAST. DATA CURRENTLY COMMUNICATED IS DISCARDED. |

FIG. 18

COMMUNICATION METHOD FOR SYSTEM INCLUDING CLIENT DEVICE AND PLURAL SERVER DEVICES

CROSS-REFERENCE TO RELATED APPLICATIONS

This application is a continuation application of International PCT Application No. PCT/JP2007/000148 which was filed on Feb. 28, 2007.

FIELD

The present invention relates to a communication method for a system including a client device and plural server devices, a computer readable storage medium recording a communication program for the system, a client device and a server device used for the system.

BACKGROUND

The inter-application communication in a main system uses TCP (Transmission Control Protocol) that has a retransmission control function and the like, since high reliability is required. In addition, an active device and a standby device are provided so that the process can be carried on when a failure occurs in a device.

In the above system, TCP connection information (the IP address, port number, sequence number) of the active device and data to be transmitted need to be passed on to the standby device when a failure occurs, but the passing on has been difficult for the following reasons.

(1) The passing on of the IP address and port number can be passed on by using a common IP address and port number between the two devices, but secure passing on of the sequence number and transmission data is difficult, since they change in packets that flow at any time during the communication.
(2) The TCP connection is point-to-point connection where there are one-on-one transmitter and recipient, so it is not allowed in the TCP to establish connection using the same TCP connection information simultaneously between a plurality of devices.
(3) As a method for solving the above problems, it is possible in theory to transmit, with every packet transmission/reception, information including its sequence number and data from the transmitter to a standby device, and to perform, after that, notification of the received data to an upper application and transmission of the transmission data to the destination apparatus. However, such implementation is difficult, since the transfer performance of the TCP deteriorate significantly with this method, and the implementation layer of the TCP is OS (kernel).

Therefore, under the current situation, it is required to switch to a standby device at the time when a failure occurs in the active device and after that, to establish the TCP connection again between the client and the standby device, and then the operation is resumed after performing confirmation of the delivery of data between the applications. For this reason, there has been a problem that it results in a long disconnected time of the operation.

While it is possible to transmit the same data simultaneously to a plurality of destinations by using the multicast communication function of UDP (User Datagram Protocol) the UDP does not have reliability functions such as the delivery confirmation, retransmission control, and so on, it cannot be used for the inter-application communication in a main system.

To implement a connection control function uniquely in the application itself and to manage its connection with a plurality of communication destination devices to secure the continuity of the operation with the switch to a standby device when a failure occurs is considered as another method.

However, it is required with the method to equip each application with a connection control function and a function to manage the connection with a plurality of communication destination devices, necessitating a significant change to the process at the application side.

Patent document 1 describes equipping an application with a function to transmit confirmation response information in response to a plurality of data packets using a single response packet, to reduce the band used for the transmission of the confirmation response packet.

Patent document 1 does not describe performing delivery confirmation of a data packet in multicast communication.

Patent document 2 describes transmitting, from a server, a packet while attaching, to each packet, representative identification information that specifies a representative client, and transmitting a response packet from only the client that received the packet having the representative identification information, to reduce the number of response packets.

Patent document 2 does not describe securing of reliability that equals to that of the TCP in multicast communication.

Patent document 1: Japanese Laid-open Patent Application No. 2004-80070
Patent document 2: Japanese Laid-open Patent Application No. 2004-120137

SUMMARY

An objective of the present invention is, when switching to a standby device in the event of a failure, to secure the continuity of the communication between application programs in a client device and in a server device that has been switched to active.

The present invention is a communication method for a system including a client device and a plurality of server devices, establishing a connection between the client device and the plurality of server devices simultaneously by transmitting a UDP packet to which a sequence number is attached to the plurality of server devices by multicast; after establishing the connection, attaching a subsequent sequence number to a UDP packet including data of an application program and transmitting the UDP packet to the plurality of server devices by multicast; storing a sequence number of an already-transmitted UDP packet in storage unit; and when an ACK packet in response to the transmitted UDP packet is returned from at least one or more of the plurality of server devices, comparing a sequence number attached to the ACK packet and the sequence number of the already-transmitted UDP packet that has been stored in the storage unit to confirm delivery of a UDP packet.

The establishing of connection mentioned above refers to the state in which one or more of the plurality of the server devices return an ACK packet to the client device in response to the multicast of an UDP packet to which a first sequence number is attached.

The invention makes it possible to realize high-speed and high-reliability inter-application communication using the UDP packet. In addition, since data transmission can be performed while establishing connection between a client device and a plurality of server devices simultaneously, even when a failure occurs in a server device that is engaged in communication with the client device and switch to another server is performed, communication between the application programs in the client device and the server device can be continued.

In the communication method according to the invention, the plurality of server devices respectively store a sequence number of a received UDP packet; a sequence number of a newly received UDP packet and the sequence number of the received UDP packet that has been stored are compared to confirm delivery of a packet; and when the delivery of the UDP packet is confirmed, the respective server devices return, to the client device, the ACK packet to which the sequence number of the received UDP packet is attached as an ACK number.

This configuration makes it possible to confirm, at the client device side, wither or not a transmitted UDP packet has been delivered to each server device.

In the communication method according to the invention, the plurality of server devices includes active and standby server devices; and when a failure in an active one of the server devices is detected and a standby one of the servers is switched to active, the UDP packet is multicast to the plurality of server devices including the server device that has been switched to active, to maintain communication between an application program of the client device and an application program of the server device that has been switched to active.

This configuration makes it possible to secure, when a failure occurs in the active server device and switched to a standby server device, the continuity of communication between the application program in the client device and the application program in the server device that has been switched to active. Therefore, discontinuation of the process of the application program with the switch to a standby device due to the occurrence of a failure can be avoided.

In the communication method according to the invention, the UDP packet is transmitted with FLAG information indicating whether a packet type is a data packet, an ACK packet or an NACK packet, a sequence number set as a consecutive number and an ACK number being attached to a header part of the UDP packet.

This configuration makes it possible to easily realize the delivery confirmation of a packet using a UDP packet.

In the communication method according to the invention, a NACK packet to which a sequence number of an undelivered UDP packet is transmitted to the client device, to request retransmission of the undelivered UDP packet.

This configuration makes it possible to specify an undelivered packet by the sequence number attached to the NACK packet and the packet can be retransmitted.

In the communication method according to the invention, information specifying either of an application mode in which a network layer returns the ACK packet in accordance with an instruction from an application program when the UDP packet is received or a network mode in which the ACK packet is returned according to a determination of the network layer when the UDP packet is received, is attached to a data part of the UDP packet.

This configuration makes it possible, when an ACK needs to be returned after the application program checks the data, to return an ACK packet from the net layer to the client device in accordance with an instruction from the application program. This makes it possible to reduce the number of ACK packets that flow on the network.

Another aspect of the present invention is a client device used for a system including a client device and a plurality of server devices, including: connection establishment unit establishing a connection with the plurality of server devices simultaneously by transmitting a UDP packet to which a sequence number is attached to the plurality of server devices by multicast; transmission unit attaching a subsequent sequence number to a UDP packet including data of an application program and transmitting the UDP packet to the plurality of server devices by multicast; and confirmation unit comparing, when an ACK packet in response to the transmitted UDP packet is returned from at least one or more of the plurality of server devices, a sequence number attached to the ACK packet and a sequence number of the already-transmitted UDP packet that has been stored in the storage unit to confirm delivery of a UDP packet.

The invention makes it possible to realize high-speed and high-reliability inter-application communication using the UDP packet. In addition, since data transmission can be performed while establishing connection between the client device and the plurality of server devices simultaneously, even when a failure occurs in a server device that is engaged in communication with the client device and switch to another server device is performed, communication between the application programs in the client device and the server device can be continued.

In the client device according to the invention, the plurality of server devices includes active and standby server devices; and the transmission unit multicasts, when a failure in an active one of the server devices is detected and a standby one of the server devices is switched to active, the UDP packet to the plurality of server devices including the server device that has been switched to active, to maintain communication between an application program of the client device and an application program of the server device that has been switched to active.

This configuration makes it possible to secure, when a failure occurs in the active server device and switched to a standby server device, the continuity of communication between the application program in the client device and the application program in the server device that has been switched to active.

Another aspect of the present invention is a server device used for a system including a client device and a plurality of server devices, including: connection establishment unit establishing a connection with the client device when a UDP packet to which a sequence number is attached and transmitted by multicast from the client device is received; storage unit storing a sequence number of an already-received UDP packet; confirmation unit comparing a sequence number of a newly-received UDP packet and a sequence number of the already-received UDP packet that has been stored in the storage unit to confirm delivery of a packet; and ACK transmission unit transmitting, to the client device, when delivery of the UDP packet is confirmed, an ACK packet to which the sequence number of the received UDP packet is attached.

The invention makes it possible to realize high-speed and high-reliability inter-application communication using the UDP packet. In addition, since data transmission can be performed while establishing connection between the client device and the plurality of server devices simultaneously, even when a failure occurs in a server device that is engaged in communication with the client device and switch to another server is performed, communication between the application programs in the client device and the server device can be continued.

BRIEF DESCRIPTION OF DRAWINGS

FIG. 4 is a description diagram of operation modes.

FIG. 7 is a diagram illustrating a control table of an ACTIVE device and a STANDBY device.

FIG. 8 is a flowchart of an ACK return process of a server device.

FIG. 10 is a diagram illustrating a control table and a recipient list of a client device.

FIG. 18 is a description diagram of API functions.

DESCRIPTION OF EMBODIMENTS

Figure 1:
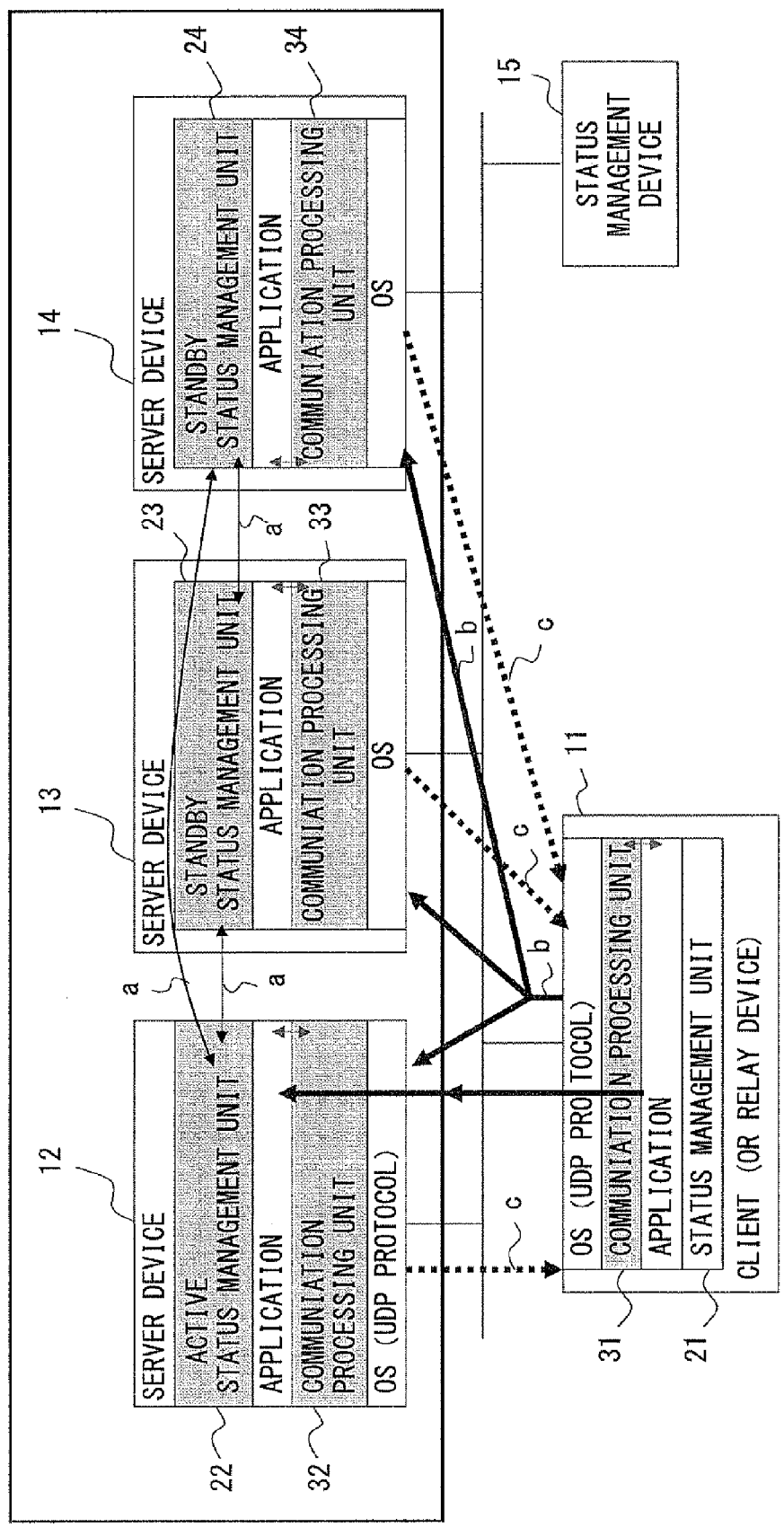
FIG. 1 is a system configuration diagram of an embodiment.

Hereinafter, the embodiments of the present invention is described, with reference to the drawings. FIG. 1 is a system configuration diagram of a main system that includes a client device and a plurality of server devices a according to the embodiment.

The system includes a client device (or a relay device) 11, an active (ACTIVE) server device 12, a plurality of standby (STANDBY) server devices 13, 14, and a status management device 15.

The status management device 15 monitors the status of the server apparatuses 12-14, and when a failure occurs in the active server 12, performs control for the switch to the standby server 13 or 14, and so on. Meanwhile, the status management device 15 also has a function to send a notification of a trouble in a server device to a status management unit 21 of the client apparatus 11.

Status management units 22, 23, 24 of the respective server units 12, 13, 14 have the similar function to that of the status management device 15, manages one of the plurality of the servers as the ACTIVE apparatus and the others as STANDBY apparatuses, and monitors the status of the hardware and software of each device, while having a function to switch to a STANDBY device when it detects a failure in the ACTIVE device.

The status management unit 21 of the client serer 11 performs the diagnosis of the breakdown of the server apparatus in cooperation with the status management device 15, when a communication processing unit 31 detects a communication trouble with the server apparatuses 12-14, and excludes, when it is determined that a certain server device has a breakdown as a result of the diagnosis, the server having the breakdown from a monitor-target server list that is managed by the communication processing unit 31.

The arrow a in FIG. 1 indicates the operation in which the status management units 22-24 of the respective server apparatuses 12-14 mutually monitor the status of the hardware and software of the other server apparatus, and detects the occurrence of a failure.

The communication processing unit 31 of the client device 11 has a function (corresponding to connection establishment unit) to establish connection simultaneously with the plurality of server devices 12-14, by performing multicast transmission of a UDP packet in for which an initial value (for example, "1") is set as a sequence number on the basis of UDP (User Datagram Protocol) to the plurality of servers.

The communication processing unit 31 has a function (corresponding to transmission unit) to perform multicast transmission of a data packet to the active and standby servers 12-14 on the basis of a transmission request from the application program.

In addition, the communication processing unit 31 has a function (corresponding to confirmation unit) to confirm the delivery of the UDP packet according to whether or not it received a confirmation response ACK (Acknowledgment) from the respective server devices 12-14 in response to the UDP packet for which the multicast transmission has been performed. When the communication processing unit 31 performs the multicast transmission of the UDP packet, it adds consecutive sequence numbers to the data part as a header, in order to guarantee the arrival order of the packets.

After confirming the reception of the ACK packet in response to the first-transmitted UDP packet (the packet for which "1" is set as the sequence number) from all the active and standby server devices 12-14, the communication processing unit 31 sends a notification of the establishment of connection to the application program (hereinafter, referred to as application).

The arrow b in FIG. 1 indicates, for example, the flow of the UDP packet transmitted by multicast from the client device 11 to the plurality of server devices 12-14.

The communication processing unit 31 of the client device 11 has a function to retransmit an undelivered packet, when it receives a negative response packet NACK (Negative Acknowledgment) that tells the delivery failure of the packet from the respective server devices 12-14.

Communication processing units 32-34 of the server devices 12-14 has a function (corresponding to connection establishment unit of the server device), when they receive for example, a UDP packet having the sequence number 1 from the client device 11, to perform unicast transmission of an ACK packet to the client device 11, and further pass the UDP packet to the application to establish connection. From the sequence number "1" in the data part of the packet, the application can recognize that it is a packet for connection establishment.

Meanwhile, the respective communication processing units 32-34 of the server devices 12-14 have a function to store the sequence number of a received UDP packet in storage unit such as a memory, a function (corresponding to confirmation unit) to check whether or not there is any missing packet, by comparing the sequence number of a newly-received UDP packet and the sequence number of received UDP packets stored in a memory and the like, and further have a function (corresponding to NACK transmission unit), when the sequence number of a received UDP packet is not consecutive with the sequence number of the received UDP packets, to determine a packet has not been delivered and to perform unicast transmission, to the client device 11, of a NACK packet to which the sequence number of the undelivered packet is added, to request the retransmission of the packet.

The arrow c in FIG. 1 indicates the flow of an ACK packet transmitted from the respective server devices 12-14 to the client device 11.

Figure 2:
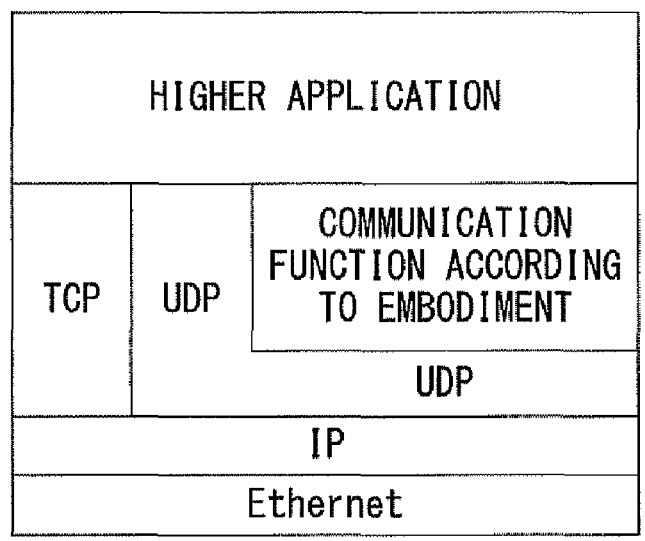
FIG. 2 is a diagram illustrating a layer on which a communication processing unit of the embodiment is implemented.

FIG. 2 is a diagram illustrating the configuration of the layers of the client device 11 and the server devices 12-14 according to the embodiment. The protocols TCP and UDP are implemented in the network layer that is a lower layer of the application layer, and the communication function (communication processing unit) of the embodiment is implemented as a program based on the UDP.

Figure 3:
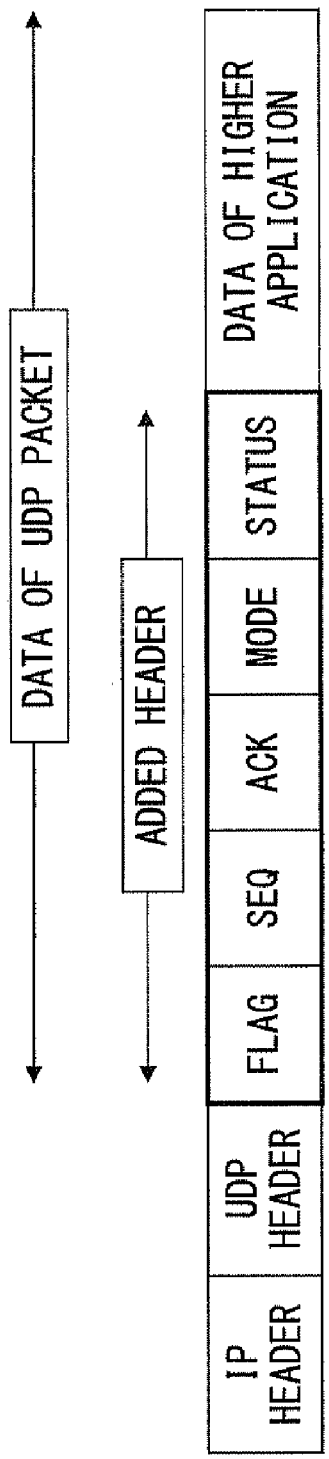
FIG. 3 is a diagram illustrating the format of an UDP packet in the embodiment.

Next, FIG. 3 is a diagram illustrating the format of the UDP packet used in the communication method according to the embodiment.

In the UDP packet according to the embodiment, FLAG, SEQ, ACK, MODE, STATUS attached to the data part of a normal UDP packet as a header, as illustrated in FIG. 2.

The packet type indicating whether a packet is a data packet, NACK or ACK is stored in FLAG. For example, "1" is stored in FLAG for the data packet, "2" for the NACK packet, "3" for the ACK packet.

The consecutive sequence number is stored in SEQ. Even for the same session, when the operation mode (for example, a safe mode and a quick mode) is different, a different sequence number is stored in SEQ.

The ACK number is stored in ACK. The ACK number is information for indicating an ACK or NACK packet is a response packet in response to a packet of which sequence number, and the sequence numbers of the target packets are stored. Meanwhile, for the ACK number of a data packet, a received sequence number from the transmission source of the packet is stored.

The mode information indicating the transmission source of a packet is waiting for a response in which operation mode. According to the present embodiment, five modes, i.e., no-wait mode, network-quick mode, network-safe mode, application-quick mode, application-safe mode are provided as the operation mode, and information specifying one of those modes is stored in MODE. For example, "1" is stored in MODE for the no-wait mode, "2" for the network-quick mode, "3" for the network-safe mode, 4" for the application-quick mode, "5" for the application-safe mode.

The status of the server device being the transmission source of a response packet is stored in STATUS. For example, when the server device 12 is active, "ACTIVE" is stored as STATUS in a response packet from the server device 12, and "STANDBY" is stored as STATUS in a response packet from the standby server device 13. At the client device 11 side, whether the transmission-source server device is ACTIVE or STANDBY can be recognized by referring to this STATUS. The data of the application is stored in the remaining data part of the packet.

FIG. 4 is a diagram illustrating the five modes mentioned above. The no-wait mode is a mode without waiting for the ACK response from the response transmitter when multicast transmission of a packet is performed.

The network-safe mode is a mode in which the network layer is the layer that returns ACK, and for waiting for the ACK response from all the server devices. The network-quick mode is a mode in which the network layer is the layer that returns ACK, and for waiting for ACK response only from a certain response transmitter.

The application-safe mode is a mode in which the application layer is the return-transmitting layer, and for waiting for the ACK response from all the response transmitters. The application-quick mode is a mode in which the application layer is the return-transmitting layer, and for waiting for the ACK response from a certain response transmitter only.

When the operation mode is set to the network-safe or quick and the return-transmitting layer is the network layer, the ACK can be returned quickly in a layer close to the OS. The modes where the application layer is the return-transmitting layer are provided in the present embodiment because there is a case in which the application at the reception side returns the ACK after confirming that the data from the application at the transmission side is normal. In this case, when the application mode is set, the ACK is transmitted when the instruction for the transmission of the ACK is given from the application at the reception side, making it possible to reduce the number of ACK packets that flow in the network.

Figure 5:
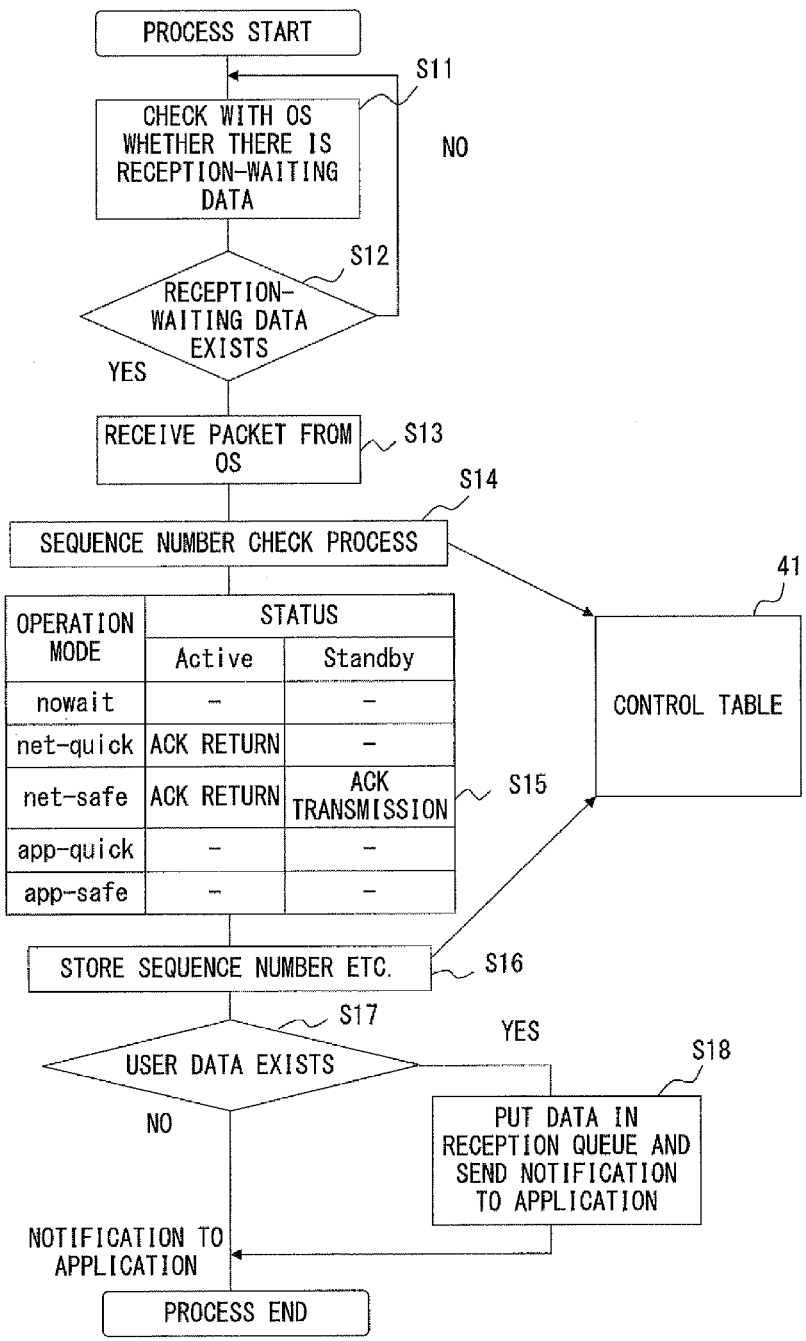
FIG. 5 is a flowchart of a reception process of a communication processing unit of a server device.
Figure 6:
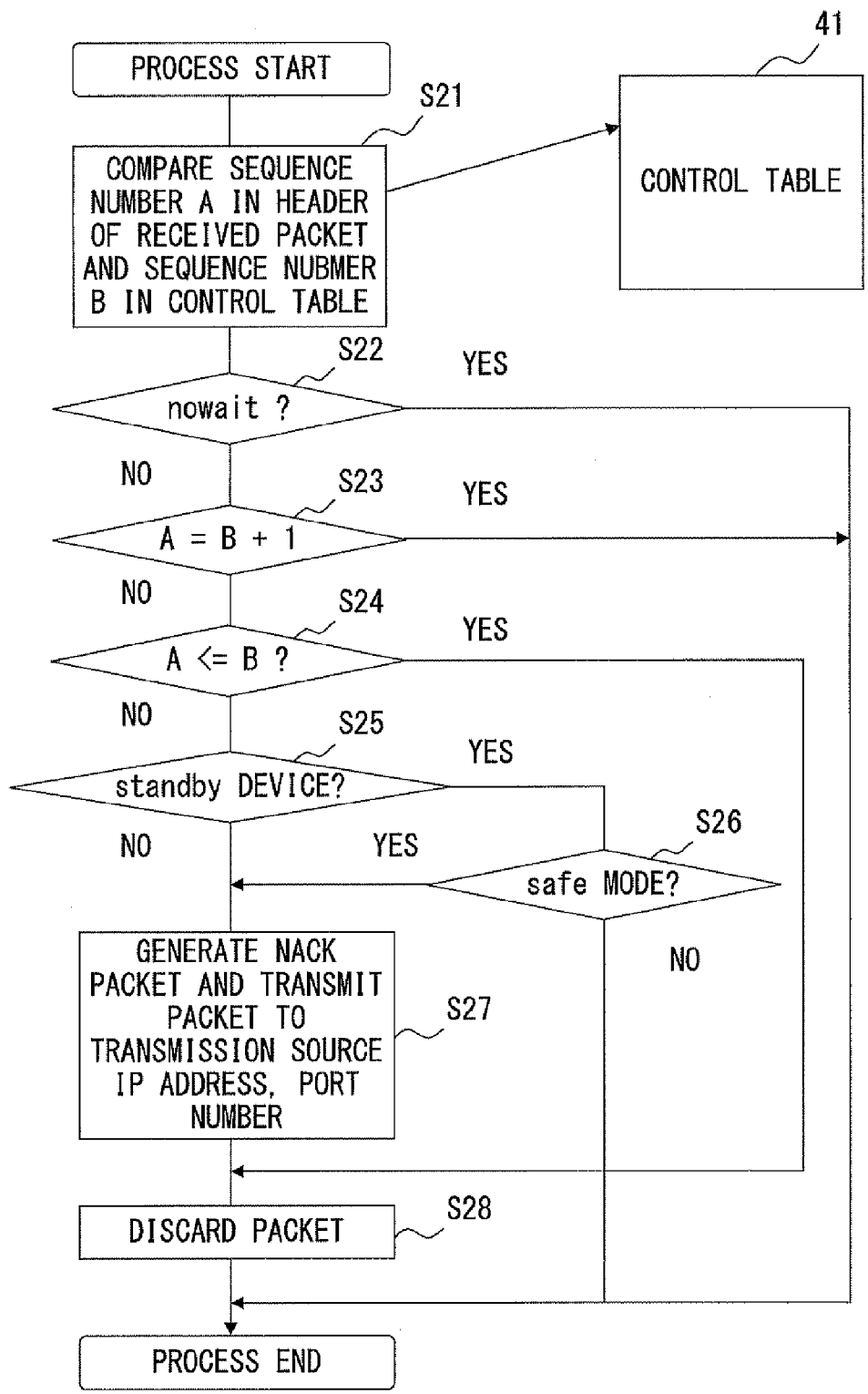
FIG. 6 is a flowchart of a check process of sequence numbers.

Next, the reception process of the server devices 12-14 in the client-server system in the embodiment is explained, with reference to the flowcharts in FIG. 5 and FIG. 6.

FIG. 5 is a flowchart of the reception process in the communication processing units 32-34 of the server devices 12-14.

As a presumption for the process, it is assumed that multicast transmission of a UDP packet for which an initial value is set as the sequence number is performed from the client device 11 to the plurality of server devices 12-14, and connection is established between the client device 11 and the plurality of server devices 12-14.

The communication processing units 32-34 of the respective server devices 12-14 check whether there is reception-waiting data with the OS (Operating System) (FIG. 5, S11), and determines whether there is reception-waiting data (S12).

When there exits reception-waiting data (S12, YES) move to step S13 is performed, and a packet is received from the OS. Then, a sequence number check process in step S14 is performed. In the sequence number check process, whether the sequence number stored in the header of the received UDP packet and the sequence number of an already-received stored in a control table 41 are consecutive is checked, to determine whether there is loss of a packet.

FIG. 6 is a detail flowchart of the sequence number check process in step S14 in FIG. 5.

Sequence number A in the header of a packet being received and sequence number B of an already-received packet stored in the control table 41 are compared (FIG. 6, S21).

Now, the control table 41 is briefly explained. The active server device (ACTIVE device) and standby server devices (STANDBY devices) generate control tables 41a and 41b as illustrated in FIGS. 7(A) and (B), respectively, when the connection is established.

The control tables 41a and 41b respectively includes the multicast IP address, the port number used by the server devices, the operation mode of the received packet (such as the application-safe mode), the already-received sequence number with the quick modes (the network-quick mode or the application-quick mode), the already-received sequence number with the safe modes (the network-safe mode or the application-safe mode), the status information indicating whether the devise is ACTIVE or STANDBY, the IP address of the client device 11, and the port number of the client device 11. The control tables 41*a* and 41*b* are stored in a memory and the like of the server devices.

In this embodiment, the sequence number with the quick modes and the sequence number with the safe modes are managed separately, to make it possible to switch the modes for each packet, for the communication with the same multicast IP address and port. For this reason, the control tables 41*a* and 41*b* described above store the sequence number with the quick modes and the sequence number with the safe modes separately.

Meanwhile, since the sequence number is uniquely set in units of clients, the control tables 41*a*, 41*b* at the server device side store the IP address of the client device 11 and the port number of the client device 11, in consideration of a case in which there are a plurality of transmitters of packets for the same port number of a server device with the same multicast IP address.

Returning to FIG. 6, in step S22, whether or not MODE stored in the header of the packet is no-wait is determined. When it is no-wait, the process is terminated then as there is no need for returning ACK.

When the MODE is not no-wait (S22, NO), move to step S23 is performed, and whether or not the sequence number A of the received packet is equal to the value obtained by adding "1" to the sequence number B with the corresponding mode stored in the control table 41. When the sequence number A of the received packet is equal to the value obtained by adding "1" to the sequence number B with the corresponding mode stored in the control table 41, that is, when the sequence numbers are consecutive (S23, YES), it is determined that there is no loss of a packet and the process is terminated then.

When the sequence number A is not consecutive with the sequence number B in the control table 41 (S23, NO), move to the next process S24 is performed, and whether or not the sequence number A of the received packet is equal to or smaller than the sequence number B in the control table 41 is determined.

When the sequence number A of the received packet is equal to or smaller than the sequence number B in the control table 41 (S24, YES), move to step S28 is performed, and the received packet is discarded.

When it is determined in step S24 that the sequence number A of the received packet is not equal to the sequence number B in the control table 41 and is larger than the sequence number B (S24, NO), move to step S25 is performed, and whether or not the device is STANDBY device or not is determined.

When the device is not STANDBY device (S25, NO) or when it is a STANDBY device (S25, YES) and it is determined in step S26 that the operation mode set in the received packet is a safe mode (S26, YES), the process of step S27 is performed. In step S27, a NACK packet indicating the loss of a packet is generated, and the NACK packet is transmitted to the transmission-source IP address and port number of the received packet. Added to the NACK packet is, for example, the missing sequence number as an ACK number. Then, the received packet is discarded in the next step S28.

When the device is a STANDBY device and the operation mode of the received packet is not a safe mode (S26, NO), the process is terminated then as there is no need for returning a response packet.

When the sequence number check in FIG. 6 is completed, the process of step S15 in FIG. 5 is performed next.

Step S15 in FIG. 5 represents the process details determined by MODE of the received packet. When the operation mode is the network-safe mode, both the ACTIVE device and STANDBY devices return ACK or NACK.

When the operation mode is the network-quick, only the ACTIVE device returns ACK or NACK. There is no need for the STANDBY devices to return ACK. Meanwhile, with the application modes, ACK is not to be returned at this stage.

Next, when the sequence number of the received packet is consecutive, the sequence number of the newly-received packet is stored in the place for the corresponding operation mode in the control table 41 (S16).

Next, whether or not user data is added to the received packet is determined (S17). When user data is added (S17, YES) move to step S18 is performed, where the received data is put into a reception queue (waiting queue), and notification of the existence of the received data is given to the application.

Next, FIG. 8 is a flowchart of a case in which when the operation mode is the application-safe or the application-quick mode, the communication processing units 32-34 of the server devices 12-14 return an ACK or NACK packet in accordance with the response instruction from the higher application.

First, the consistency between the detail of the instruction from the higher application and the control table 41 is checked (FIG. 8, S31), and whether or not the check result is normal is determined (S32). When it is determined that the check result is abnormal (S32, NO), move to step S33 is performed, and a notification of an error is sent to the higher application. This process is for detecting an error occurring at the application side by determining whether the instruction from the application is consistent with the operation mode stored in the control table 41.

When the consistency check is determined as normal in step S32 (S32, YES), move to step S34 is performed, and the client IP address, port number and the like stored in the control table 41 is obtained to generate a transmission packet. Then, request for the transmission of the generated packet by unicast is performed to the OS (S35).

Next, the processing operation of the communication processing unit 31 of the client device 11 is described with reference to the flowchart in FIG. 11-FIG. 13.

Figure 9:
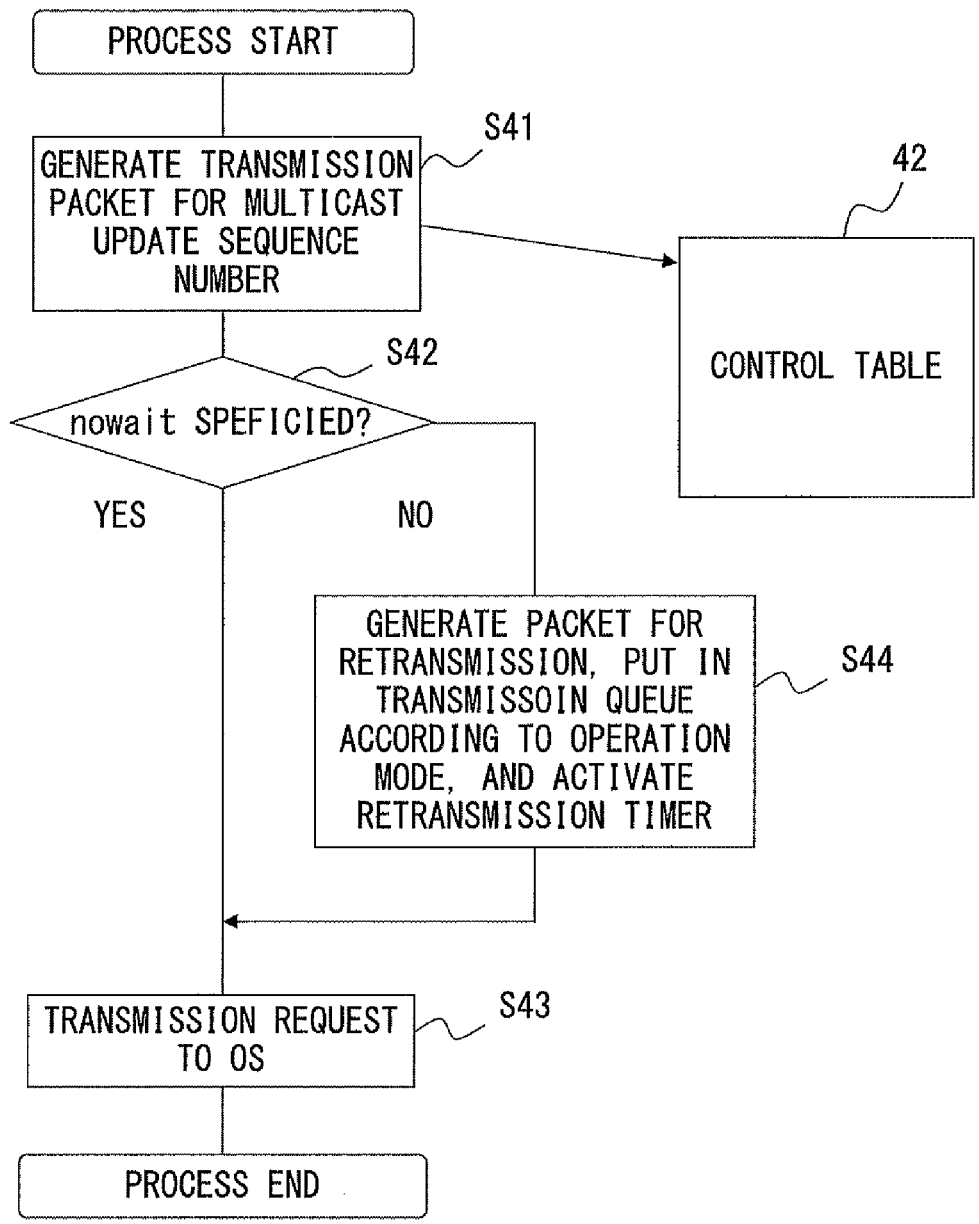
FIG. 9 is a flowchart of a transmission process of a client device.

First, a transmission packet to multicast is generated, and the sequence number in a control table 42 is updated (FIG. 9, S41).

Here, the control table 42 generated by the communication control unit 31 of the client device 11 is described with reference to FIG. 10.

As illustrated in FIG. 10 (A), the control table 42 includes a multicast IP address, port number, initial value for the packet retransmission (initial value of the timer time), number of the packet retransmission, maximum value for the packet retransmission (maximum value of the timer time), operation mode of the last-transmitted packet, the already-transmitted sequence number with quick modes, the already-transmitted sequence number with safe modes, and recipient list 42*a*.

The recipient list 42*a* stores the IP address of each server device, information (status 1) indicating whether each server is ACTIVE or STANDBY, information (status 2) indicating whether or not each device is operating normally, the already-received ACK number received from each server device during a quick mode, and the already-received ACK number received from each server during a safe mode.

From the control table 42 in FIG. 10 (A), it is understood that the already-transmitted sequence number with quick modes is "100", and the already-transmitted sequence number with safe modes is "200". Meanwhile, since the already-received ACK number with quick modes in a recipient list 42b in FIG. 10(B) is 100, it is understood that an ACK for the transmission packet having the sequence number "100" has been returned from the ACTIVE device. In addition, since the already-received ACK number with safe modes is "199" in all the recipients (server devices), it is understood that an ACK for the packet having the sequence number "200" has not been returned from any of the recipients.

The communication processing unit 31 of the client device 11 is capable of performing the delivery confirmation of a UDP packet from the already-transmitted sequence number and the already-received ACK number in the recipient list 42a. In addition, it is capable of determining the retransmission interval of the timer and the like on the basis of the initial value for the packet retransmission, the number of the retransmission, and so on.

Returning to FIG. 9, in step S42, whether or not the operation mode of a received packet is the no-wait mode is determined. When the operation mode is the no-wait mode, there is no need for waiting for a response packet from the server devices 12-14, so move to step S43 is performed, and request for the multicast transmission of an UDP packet is performed to the OS.

Meanwhile, when the operation mode is not no-wait (S42, NO), the retransmission of the packet at certain intervals is required, so a packet for retransmission is generated and put into a transmission queue according to the operation mode, and the retransmission timer is activated. After that, move to step S43 mentioned above is performed, and request for the multicast transmission of an UDP packet is performed to the OS.

Next, the ACK reception process and retransmission process of the communication processing unit 31 of the client device 11 is described with reference to the flowchart in FIG. 11-FIG. 13.

Figure 11:
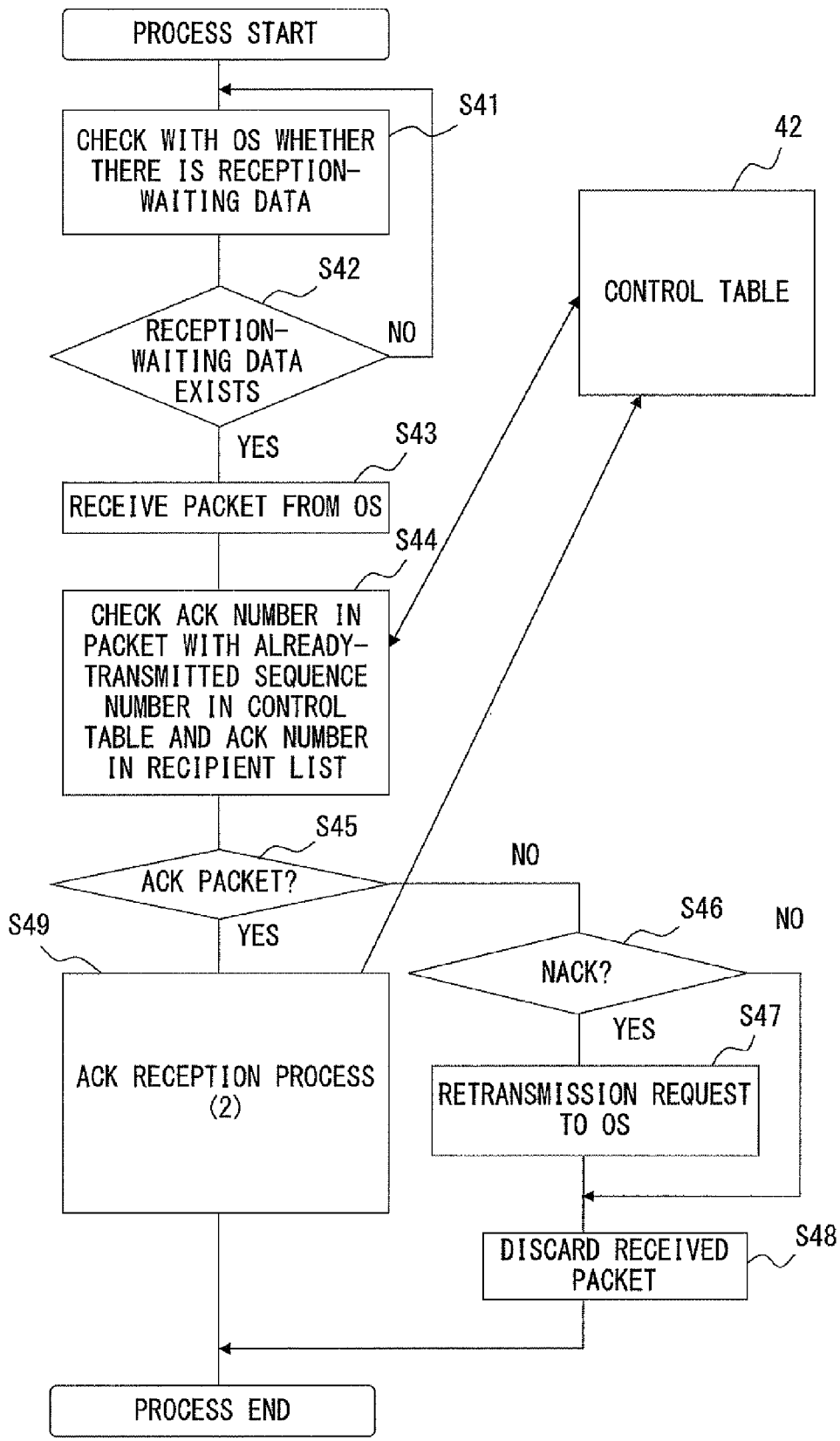
FIG. 11 is a flowchart of an ACK reception process (1) of a client device.

FIG. 11 is a flowchart of ACK reception process (1) for receiving an ACK from the server devices 12-14.

The communication processing unit 31 of the client device 11 checks with the OS whether or not there is any reception-waiting data (FIG. 11, S41), and determines whether or not there is any reception-waiting data on the basis of the result (S42).

When there is no reception-waiting data (S42, NO) return to step S41 is performed, and the above process is repeated.

When there is reception-waiting data (S42, YES), move to step S43 is performed, and a packet is received from the OS.

Next, the ACK number of the received packet is checked with the already-transmitted sequence number of the corresponding mode stored in the control table 42 and the already-received ACK number corresponding to the recipient IP address in the recipient list 42a (S44).

From FLAG in the header part of the received packet, whether or not it is an ACK packet is determined (S45). When it is not an ACK packet (S45, NO), move to step S46 is performed, and whether or not it is a NACK packet is determined. When it is a NACK packet (S46, YES), request for the retransmission of the packet specified by the ACK number of the NACK packet is performed in step S47. After that, in the next step S48, the received packet (NACK packet) is discarded. Meanwhile, when it is determined as not being a NACK packet in step S46 (S46, NO) move to step S48 is performed and the received packet is discarded.

When the received packet is determined as an ACK packet in step S45 (S45, YES), ACK reception process (2) in step S49 is performed.

Figure 12:
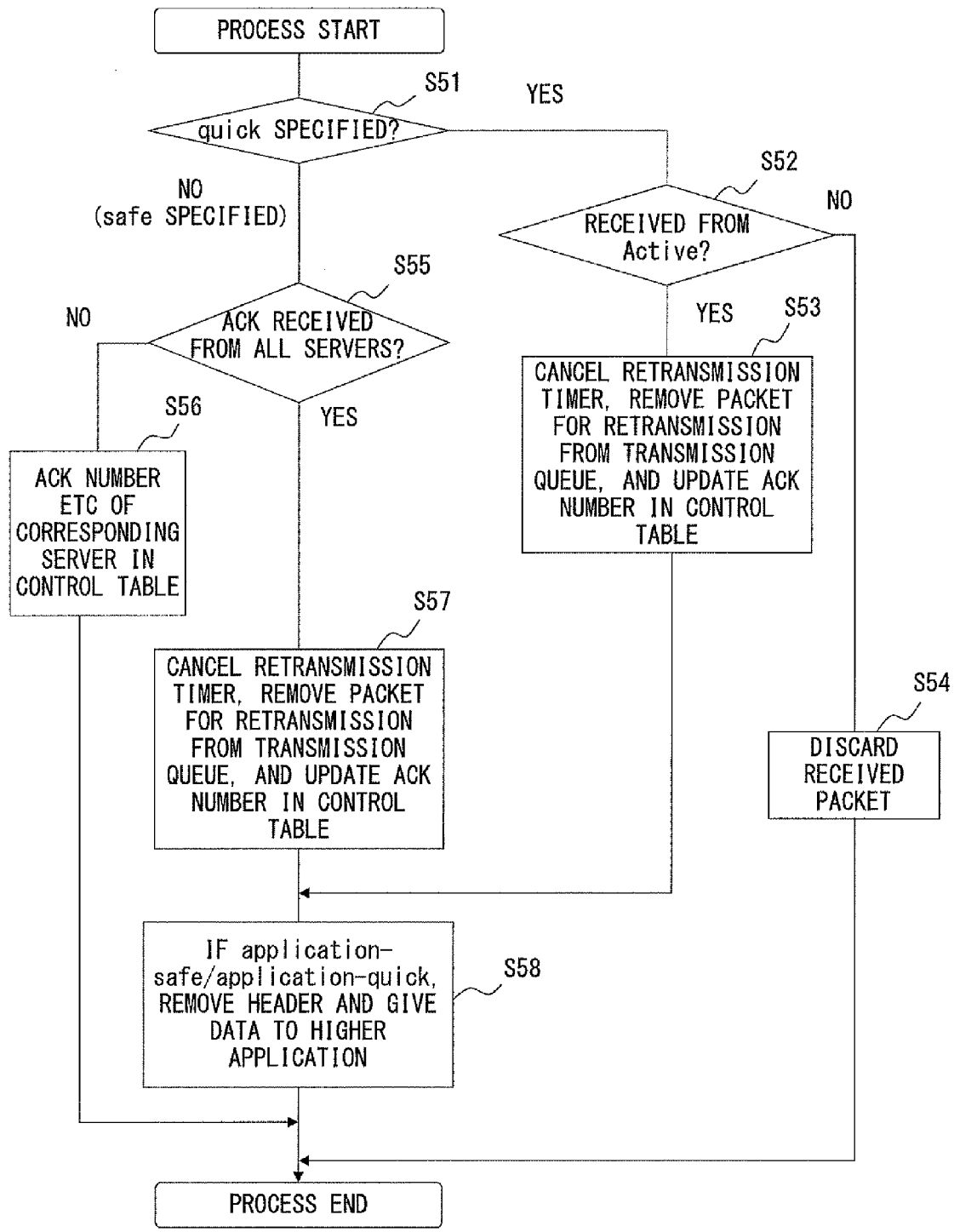
FIG. 12 is a flowchart of an ACK reception process (2) of a client device.

FIG. 12 is a detail flowchart of ACK reception process (2) in step S49 in FIG. 11.

First, whether or not MODE of the ACK packet is a quick mode is determined (FIG. 12, S51). When a quick mode is specified as the operation mode (S51, YES) move to step S52 is performed, and whether or not the ACK packet was received from the ACTIVE device is determined. Whether or not the packet was received from the ACTIVE device can be determined from the STATUS information attached to the ACK packet.

When an ACK packet from the ACTIVE device is received (S52, YES), the process in step S53 is performed. In step S53, the retransmission timer is cancelled, the packet for retransmission is removed from the transmission queue, and the already-received ACK number of the corresponding recipient (ACTIVE device) in the recipient list in the control table 42 is updated. The update of the ACK number is performed by writing the ACK number of the latest ACK packet of the recipient into the recipient list.

Meanwhile, when it is a quick mode and an ACK packet was received other than from the ACTIVE device (S52, NO), move to step S54 is performed, and the received packet is discarded. This is because during the quick mode, the delivery confirmation is required only with the ACTIVE device.

When it is determined in step S51 that the operation mode is not a quick mode (S51, NO), that is, when it is a safe mode, move to step S55 is performed, and whether or not an ACK packet has been received from all the server devices is determined.

When an ACK packet has not been received from all the server devices (S55, NO), move to step S56 is performed, and the process is terminated after the already-received ACK number of the recipient (server device) that received the current ACK packet in the recipient list 42a in the control table 42 is updated.

When it is determined in step S55 that an ACK packet has been received from all the server devices (S55, YES), move to step S57 is performed, the retransmission timer is cancelled, and the packet for retransmission is removed from the transmission queue, and further, the already-received ACK number of the corresponding recipient in the recipient list 42a in the control table 42 is updated.

In the next step S58, if MODE of the ACK packet is the application-safe mode or the application-quick mode, the header of the ACK packet is removed, and data is given to the higher application.

Figure 13:
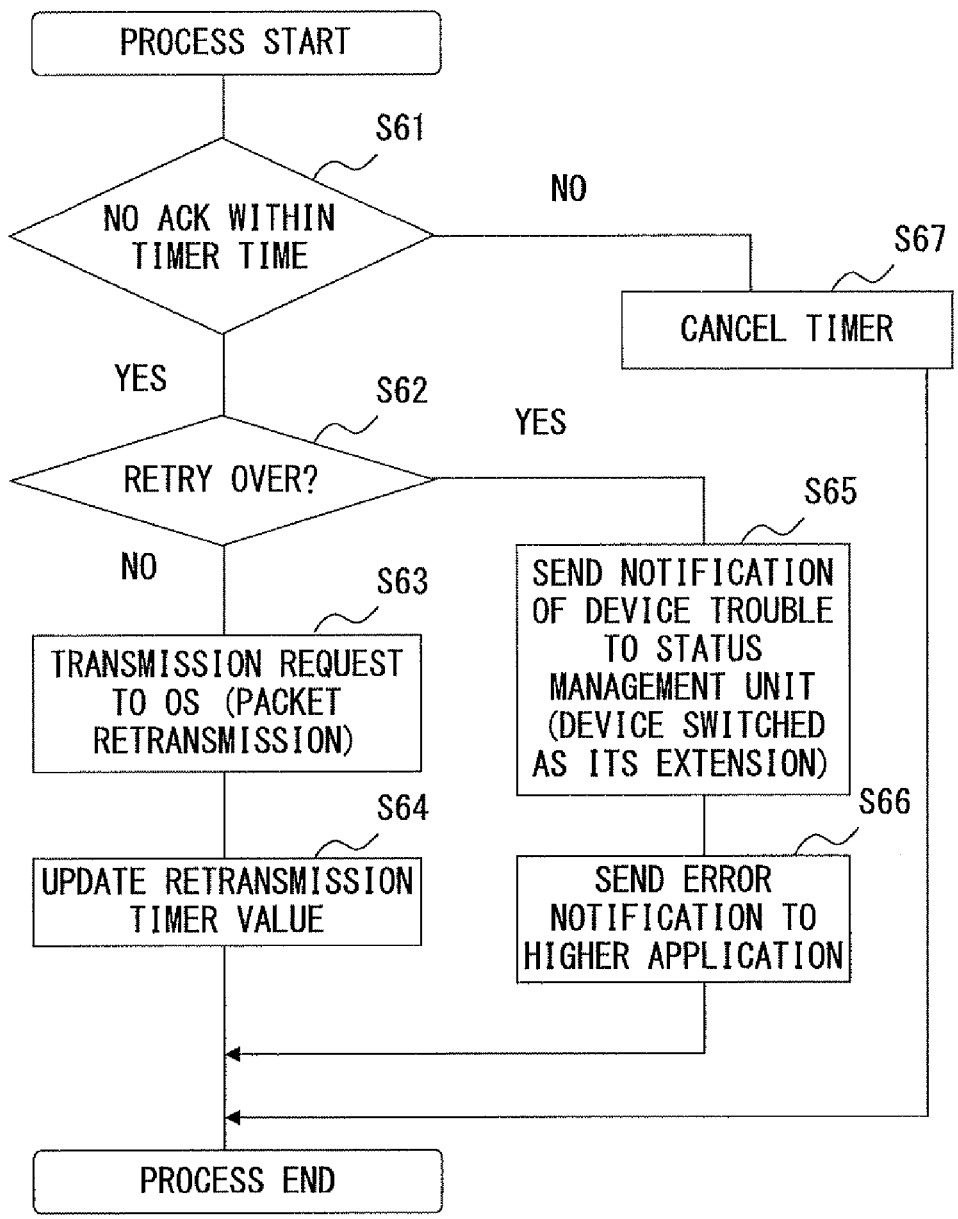
FIG. 13 is a flowchart of a retransmission process of a client device.

Next, the retransmission process in the communication processing unit 31 of the client device 11 is described in reference to the flowchart in FIG. 13.

Figure 19:
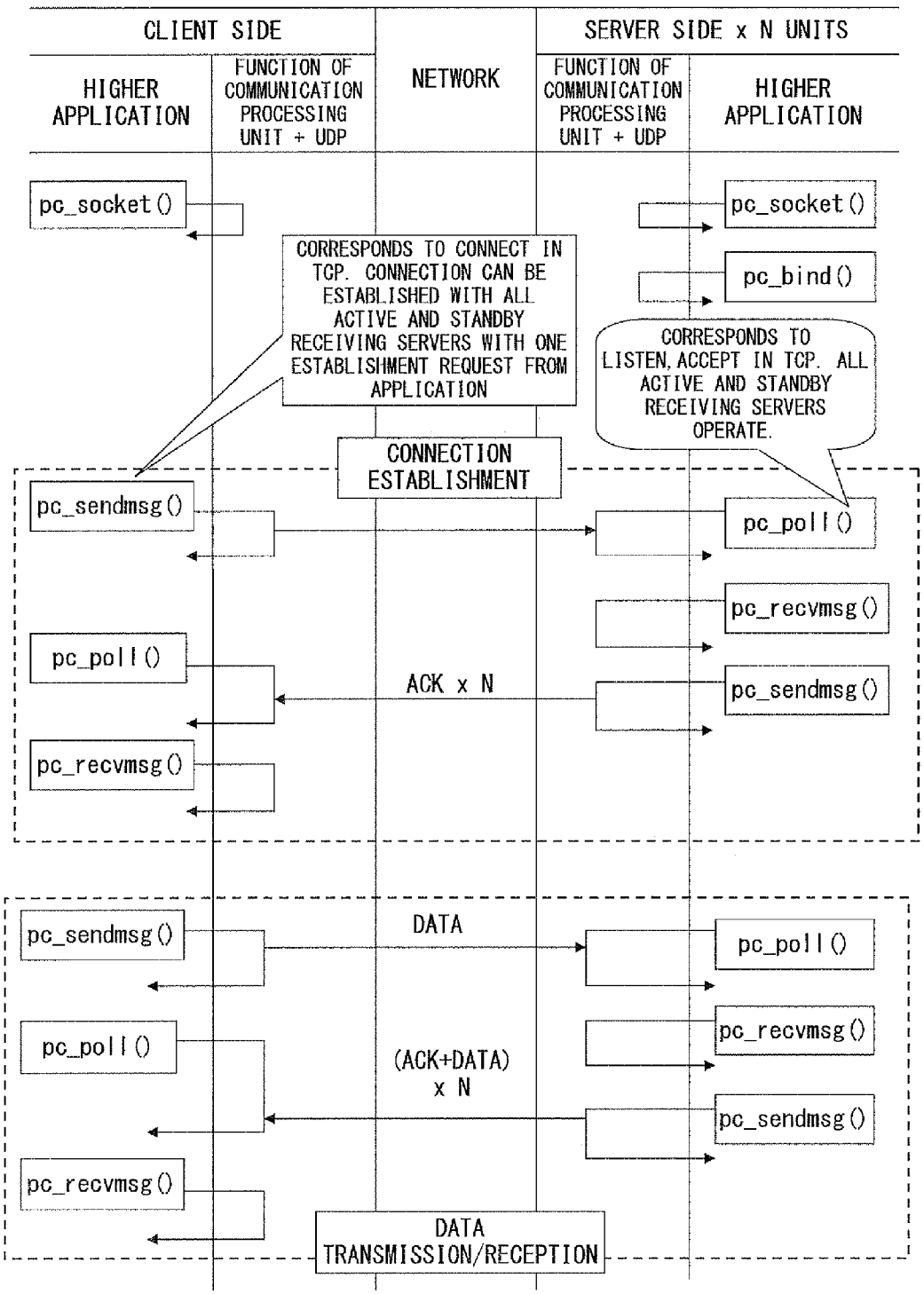
FIG. 19 is a diagram illustrating a communication sequence using API functions.

First, whether or not an ACK packet was received within the set timer time is determined (FIG. 13, S61). As the initial value of the timer time, for example the initial value for the packet retransmission (for example, 200 ms) in the control table 42 in FIG. 19 is set, and whether or not an ACK packet was received within the timer time is determined.

When an ACK packet is not received within the timer time (S61, YES), move to step S62 is performed, and whether or not the timer time has exceeded the retry time for the retransmission. As the retry time, the maximum value for the packet retransmission in the control table 42 in FIG. 10 is used as the upper limit of the retry time.

When the time measured by the timer has not exceeded the retry time (S62, NO), move to step S63 is performed, and retransmission request of the packet is performed to the OS. Then, in the next step S64, the set time for the timer for the retransmission is updated. In this embodiment, the retransmission intervals are made longer gradually, so the retransmission timer value is updated every time.

When it is determined in step S62 that the retry time has been exceeded (S62, YES), move to step S65 is performed, a notification of the device trouble of the transmission destination is sent to the status management unit 21. Further, in the next step S66, an error notification is sent to the higher application, telling that an ACK packet has not been returned from a certain server device.

When it is determined in step S61 that an ACK packet was returned within the set time for the timer (S61, NO), move to step S67 is performed, and the timer is cancelled. This stops the retransmission.

Figure 14:
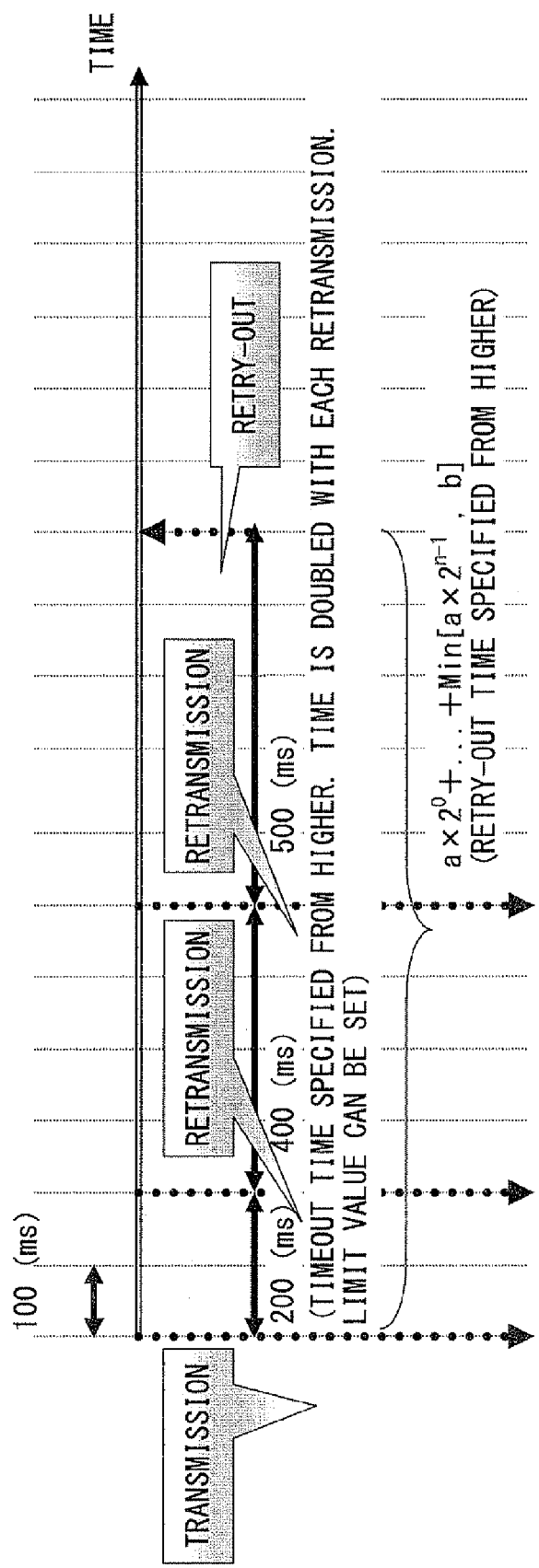
FIG. 14 is a description diagram of a retransmission timer.

Here, the process of monitoring the return of the ACK from the server devices 12-14 in the client device 11 is described with reference to FIG. 14.

The communication processing unit 31 of the client device 11 sets, when it receives a packet, the initial value for the packet retransmission in the control table 42, for example 200 ms, as the upper value of the timer, and monitors whether or not a response packet is returned within the time.

When a response packet was not returned within the set timer time of 200 ms, for example, 400 ms that is twice the initial value is set as the upper value of the timer. In the example FIG. 14, as the retransmission timer of the packet, each time the number of the retransmission increases, the upper limit of the timer is set to increase to twice, four times, eight times . . . the initial value a, within the range of the maximum value for the packet retransmission in the control table 42.

When a response packet is not returned during the 400 ms, a time that is equal to or less than the maximum value of the number of the packet retransmission in the control table 42 (for example, three times) and equal to or less than the maximum value for the packet retransmission (for example, 500 ms) is set as the upper limit of the timer.

When a response packet is not returned after the set upper limit of the timer exceeds the maximum value for the packet retransmission (retry-out time) in the control table 42, the communication processing unit 31 determines that a trouble has occurred in the server device being the transmission destination of the packet, and sends a notification of the trouble to the status management unit 21.

Figure 15:
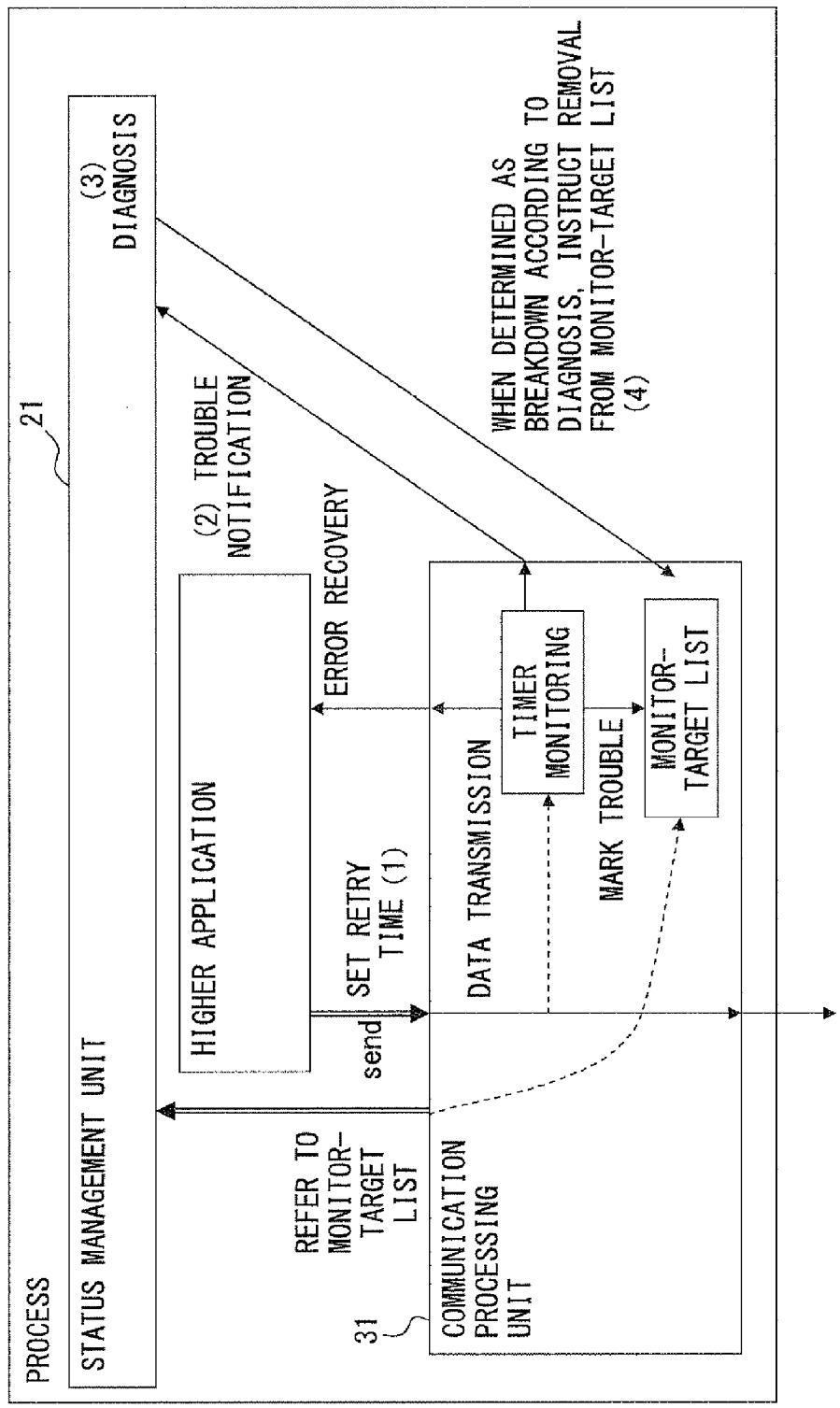
FIG. 15 is an operation description diagram of a communication processing unit and a status management unit in the event of timeout.

FIG. 15 is an operation description diagram of the communication processing unit 31 and the status management unit 21 of the client unit 11 when retransmission control of a packet on the basis of UDP.

When the retry time for the retransmission control is set by the upper application (FIG. 15, (1)), the communication processing unit 31 performs timer monitoring referring to a monitor-target list. Then, when a response packet is not returned after the maximum retry time is over, the target server device is specified and a notification of the trouble of the device is sent to the status management unit 21 (FIG. 15, (2)).

The status management unit 21 sends a notification of the occurrence of a failure to the status management units 22-24 of the respective server devices 12-14, and collects information about the server device in which the failure seems to have occurred, to perform the diagnosis as to whether it is a breakdown or not (FIG. 15, (3)). The diagnosis of the breakdown may be performed by an external status management device 15 and a notification of the result may be sent to the client device When the status management unit 21 determines a breakdown of a server device according to the diagnosis, it instructs the communication processing unit 31 to delete the corresponding server device from the monitor-target list (FIG. 15, (4)).

By the process of the communication processing unit 31 of the client device 11, a UDP packet for which a certain initial value is set as the sequence number is transmitted by multicast to the plurality of servers 12-14, and the connection can be established with both the ACTIVE device and STANDBY devices simultaneously. In addition, by transmitting a UDP packet of application data to the plurality of server devices 12-14 by multicast, the same application data can be transmitted to the ACTIVE device and the STANDBY device simultaneously, and the delivery of the packet can by confirmed.

Figure 16:
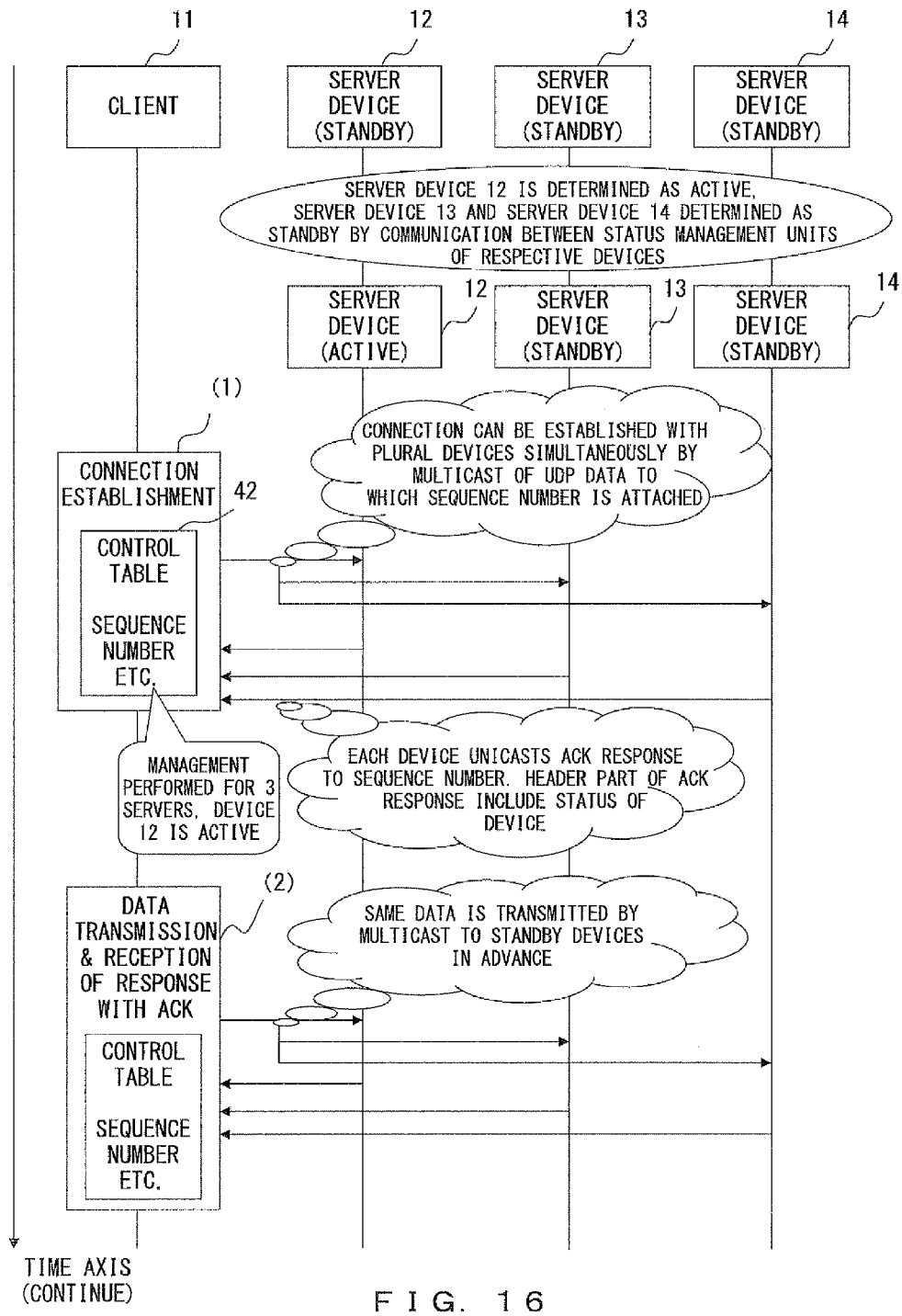
FIG. 16 is a diagram illustrating a communication sequence (1) of a client device and a server device.
Figure 17:
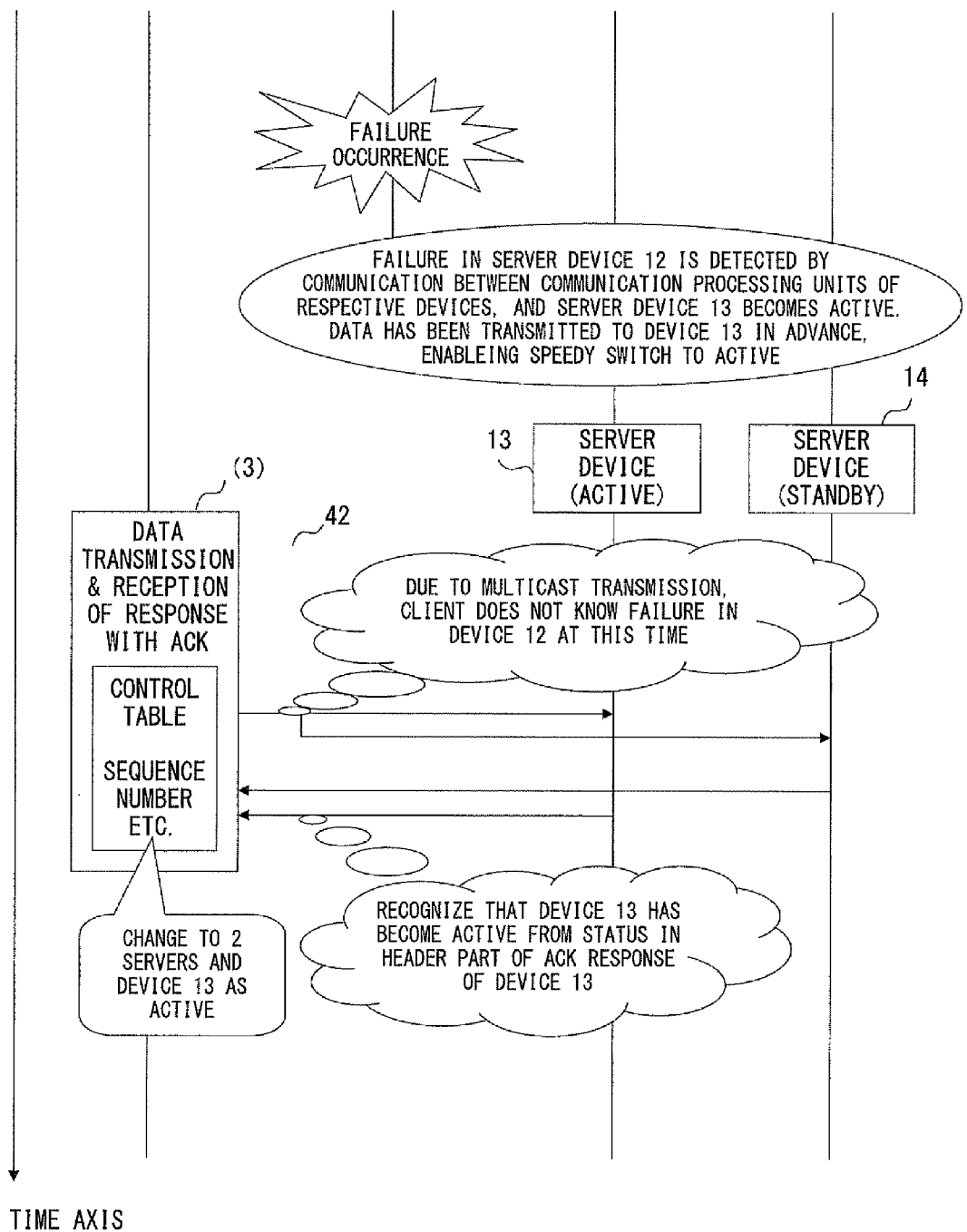
FIG. 17 is a diagram illustrating a communication sequence (2) of a client device and a server device.

Next, the communication operation between the client device 11 and the server devices 12-14 by the communication method according to the embodiment is described, with reference to FIG. 16 and FIG. 17. In FIG. 16 and FIG. 17, the vertical axis is the time axis, indicating that the time flows in the top-to-bottom direction in the figures.

The server devices 12-14 perform communication between their respective status management units 22-24, and decide the ACTIVE device and STANDBY devices. Now, it is assumed that the server device 12 is determined as the ACTIVE device and the server devices 13, 14 are determined as the STANDBY devices.

The communication processing unit 31 of the client device 11 transmits a UDP packet for establishing connection to the respective servers 12-14 by multicast while attaching the sequence number, information such as MODE specifying the operation mode, in order to establish connection with the server devices 12-14 simultaneously (FIG. 16 (1)).

When the communication processing units 32-34 of the respective server devices 12-14 receive a UDP packet for which an initial value (for example, "1") is set as the sequence number from the client device 11, they transmits an ACK packet in response to it to the client device 11 by unicast. At this time, the sequence number, ACK number, and STATUS information indicating whether each device is ACTIVE or STANDBY are attached to the UDP packet transmitted from the respective servers 12-14.

When the communication processing unit 31 of the client device 11 receives an ACK packet in response to the UDP packet that was transmitted first, the communication processing unit 31 stores the IP address, STATUS information and already-received ACK number of the respective server devices 12-14 in the recipient list 42a in the control table 42.

The communication processing unit 31 of the client device 11 transmits process data of the application to the ACTIVE device (server device 12) and the STANDBY devices (server devices 13, 14) by transmitting an UDP packet by multicast while attaching the sequence number. Meanwhile, when the communication processing unit 31 receives an ACK in response to the transmitted packet from both the ACTIVE device and the STANDBY devices, it writes in the ACK number of the ACK packet of each server device into the recipient list 42a in the control table 42 (FIG. 16, (2)).

Next, the operation in a case when a failure occurs in the ACTIVE device is described with reference to FIG. 17.

When a failure in a server device (ACTIVE device) is detected by the communication between the status management units 22-24 of the server devices 12-14, a certain device, for example, the server device 13 becomes ACTIVE in accordance with a predetermined priority order, and the server device 14 maintains its STANDBY status. The switch of the ACTIVE device may be performed by the external status management device 15 instead of the status management devices 22-24 of the server devices 12-14.

At this time, since the same data of the application sent to the server device having the failure has been transmitted to the server device 13 that has been in the STANDBY status, the server device 13 is able to continue the process for the data of the application transmitted from the client device 11.

Since the communication processing unit 31 of the client device 11 has transmit a packet by multicast, the communication processing unit 31 cannot tell, at this time, that the ACTIVE device has been switched, but when the communication processing unit 31 receives an ACK packet from the server device 13 that has been switched to ACTIVE, the communication processing unit 31 can recognize that the server device 13 has become the ACTIVE device, from the STATUS information of the ACK packet (FIG. 17, (3)).

Next, FIG. 18 is a correspondence table in which the API functions provided for the application is associated with the TCP-API functions.

In this embodiment, API functions such as pc_socket( ), pc_setsockopt( ), pc_getsockopt( ), pc_bind( ), pc_sendmsg( ), pc_recvmsg( ), pc_poll( ), pc_close( ) are provided for the application.

Pc_socket( ) corresponds to socket( ) of TCP, and has a function to generate a socket for high-reliability multicast.

Pc_setsockopt( ) corresponds to setsockopt( ) of TCP, and has functions such as setting the timeout time initial setting of recipients, and setting of the delivery confirmation method for a specified socket.

Pc_getsockopt( ) corresponds to getsockopt( ) of TCP, and has a function to obtain information such as the timeout time, status of the recipient instance and the delivery confirmation method set in the specified socket.

Pc_bind( ) corresponds to bind( ) of TCP, and has a function to instruct a socket for multicast to start reception.

Pc_sendmsg( ) corresponds to sendmsg( ) of TCP, and has a function to transmit data to a recipient instance.

Pc_recvmsg( ) corresponds to recvmsg( ) of TCP, and has a function to receive data.

Pc_poll( ) corresponds to poll( ) of TCP, and has a function to wait until an event of a transmission, reception or error, and to shift to an error process after the specified timeout time is over.

Pc_close corresponds to close( ) of TCP, and has a function to collect the socket for high-reliability multicast. By this instruction, data being transmitted is discarded.

Based on the assumption of the API functions described above, the communication procedures for establishing connection between the client device 11 and the plurality of server devices 12-14 simultaneously, for transmitting data, and for transmitting an ACK packet from the server devices are explained with reference to the sequence diagram in FIG. 19.

When the application of the client device 11 first establishes connection, it issues pc_sendmsg ( ). The first issue of pc_sendmsg( ) corresponds to connect ( ) of TCP, and connection can be established with all the server devices of ACTIVE and STANDBY simultaneously with the one request for the connection establishment from the application.

When the communication processing unit 31 of the client device 11 receives pc_sendmsg( ) from the higher application, it transmits an UDP packet to the plurality of server devices 12-14 while attaching the sequence number, MODE, STATUS and so on.

The communication processing units 32-34 stores the multicast IP address, sequence number and so on of the received UDP packet in their control table 42, and transmits an ACK by unicast to the client device 11. At this time, the higher application issues pc_poll ( ), pc_recmesg( ) and receives the UDP packet. These API functions correspond to accept ( ) and the like of TCP.

The communication processing unit 31 of the client device 11 establishes connection when it receives an ACK in response to the UDP packet that was transmitted first (the packet having the initial value "1" as the sequence number). The higher application issues pc_recvmsg( ) and receives the data of the UDP packet.

Next, the application issues pc_sendmsg( ) and instructs the communication processing unit 31 to transmit the data of the application. The communication processing unit 31 transmits the data of the application by an UDP packet to the plurality of server devices 12-14 simultaneously.

The respective communication processing units 32-34 of the respective servers 12-14 receive the multicast data packet. The application of the respective server devices 12-14 issue pc_recvmsg( ) and receives the data packet. Further, the application issues pc_sendmsg( ) to instruct the return of an ACK. The respective communication processing units 32-34 transmits an ACK packet to the client device 11.

The above operations are repeated and the data of the application of the client device 11 is sent to the ACTIVE server device 12 and the STANDBY server devices 13, 14 simultaneously. Meanwhile, when the respective servers 12-14 detects an undelivered packet by the sequence number, they request the retransmission of the packet by attaching, to a NACK packet, the missing sequence number as the ACK number. When the client device 11 receives a NACK packet, it retransmits the packet specified by the ACK number attached to the NACK packet. This makes it possible to secure the consistency of the data of the application both in the ACTIVE and STANDBY devices.

Figure 20:
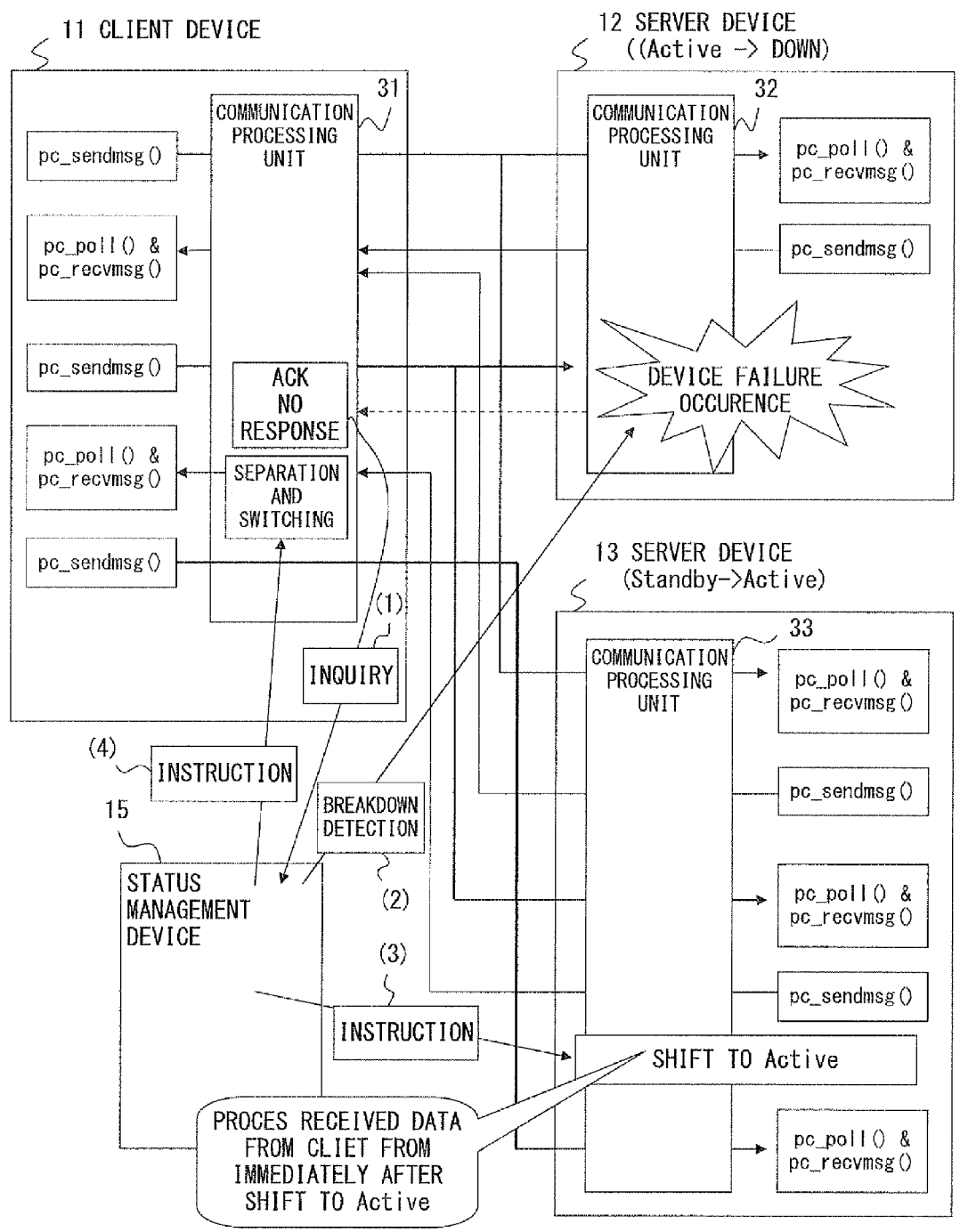
FIG. 20 is an operation description diagram in the event of the occurrence of failure.

Next, FIG. 20 is an operation description diagram in the event of a failure. After the client device 11 establishes connection simultaneously with the ACTIVE server device 12 and the STANDBY server device 13, it transmits the application data using by multicast using a UDP packet to the respective server devices 12, 13.

When the communication processing unit 31 of the client device 11 detects that an ACK from the ACTIVE server device 12 is not received for over a certain time, it inquires with the status management device 15 as to the status of the server device 12 (FIG. 20, (1)).

The status management device 15 checks the status of the server device 12, and when a failure is detected (FIG. 20, (2)), the status management device 15 separates the ACTIVE device 12, and instructs the server device 13 to shift to ACTIVE (FIG. 20, (3)). At this time, a notification telling that the server device 12 has been separated and the server device 13 has been switched to ACTIVE is sent to the client device 11 (FIG. 20, (4)).

The server device 13 that shifted to ACTIVE has received all the application data that has been transmitted to the server device that was ACTIVE, the consistency with the data received by the server device 12 has been secured. Therefore, the communication with the application of the client device 11 can be maintained and the process can be continued from immediately after the switch from STANDBY to ACTIVE.

Therefore, even when a failure occurs in the active device, the switch to the standby device can be performed without discontinuing the process of the application.

Next, the delivery confirmation method of a packet in each operation mode is described with reference to FIG. 24.

Figure 21:
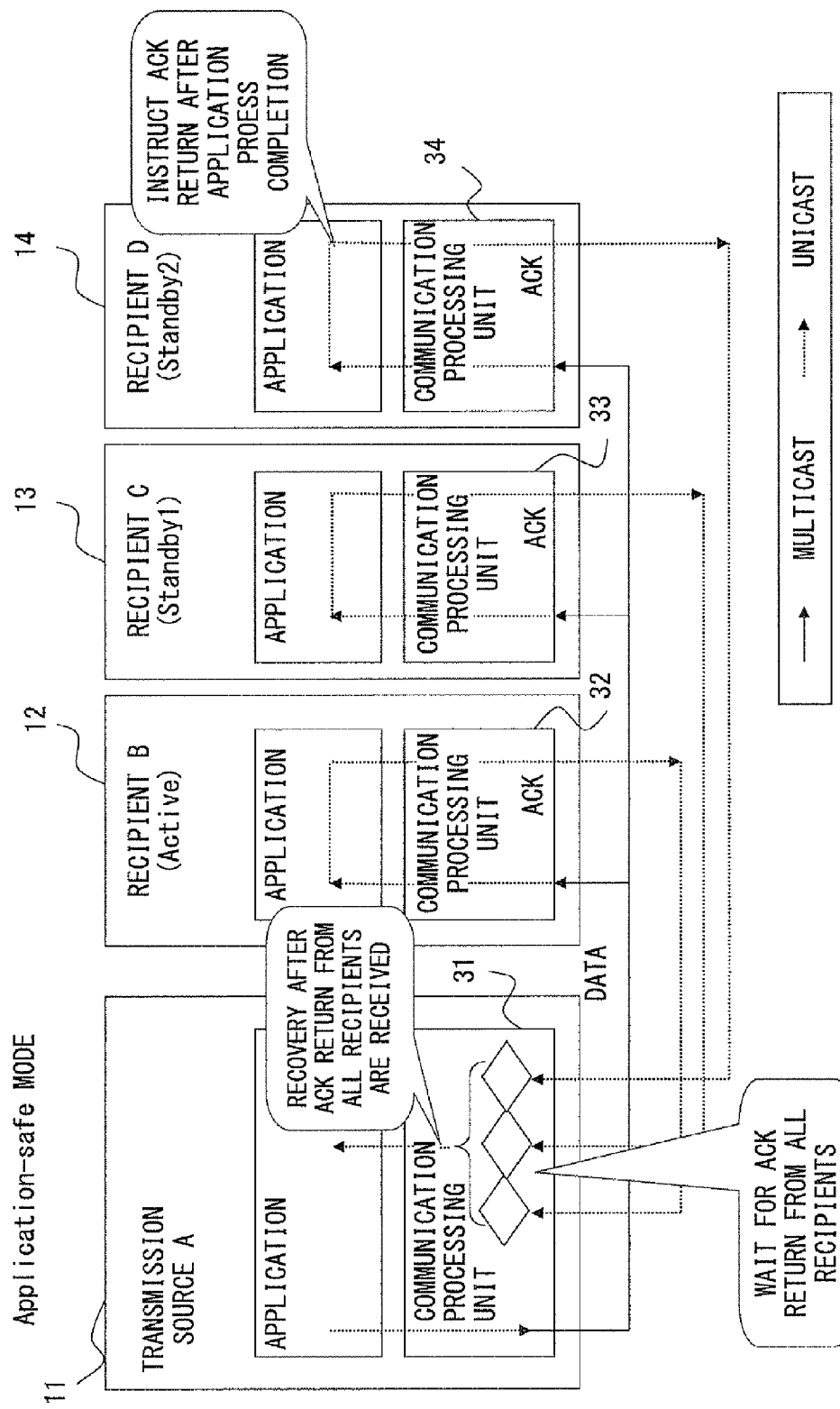
FIG. 21 is a description diagram of a delivery confirmation method in an application-safe mode.

FIG. 21 is a description diagram of the delivery confirmation method in the application-safe mode. The application-safe mode is a mode in which all the server devices return an ACK from the application layer. In FIG. 21-FIG. 24, a slid arrow represents multicast packet transmission, and a broken arrow represents unicast packet transmission.

The communication control unit 31 of the client device 11 transmits an UDP packet by multicast to all the server devices 12-14.

The communication processing units 32-34 of the respective server devices 12-14 compares the sequence number of a received packet and the sequence number of an already-received packet stored in the control table 41 to check whether there is a missing packet or not. When it is determined that there is no missing packet, the data of the packet is given to the application. The application checks whether or not the data is normal, and after the completion of the process of the data, instructs the communication processing units 32-34 to return an ACK. The communication processing units 32-34 of the respective servers 12-14 respectively transmits an ACK by unicast to the client device 11.

Figure 22:
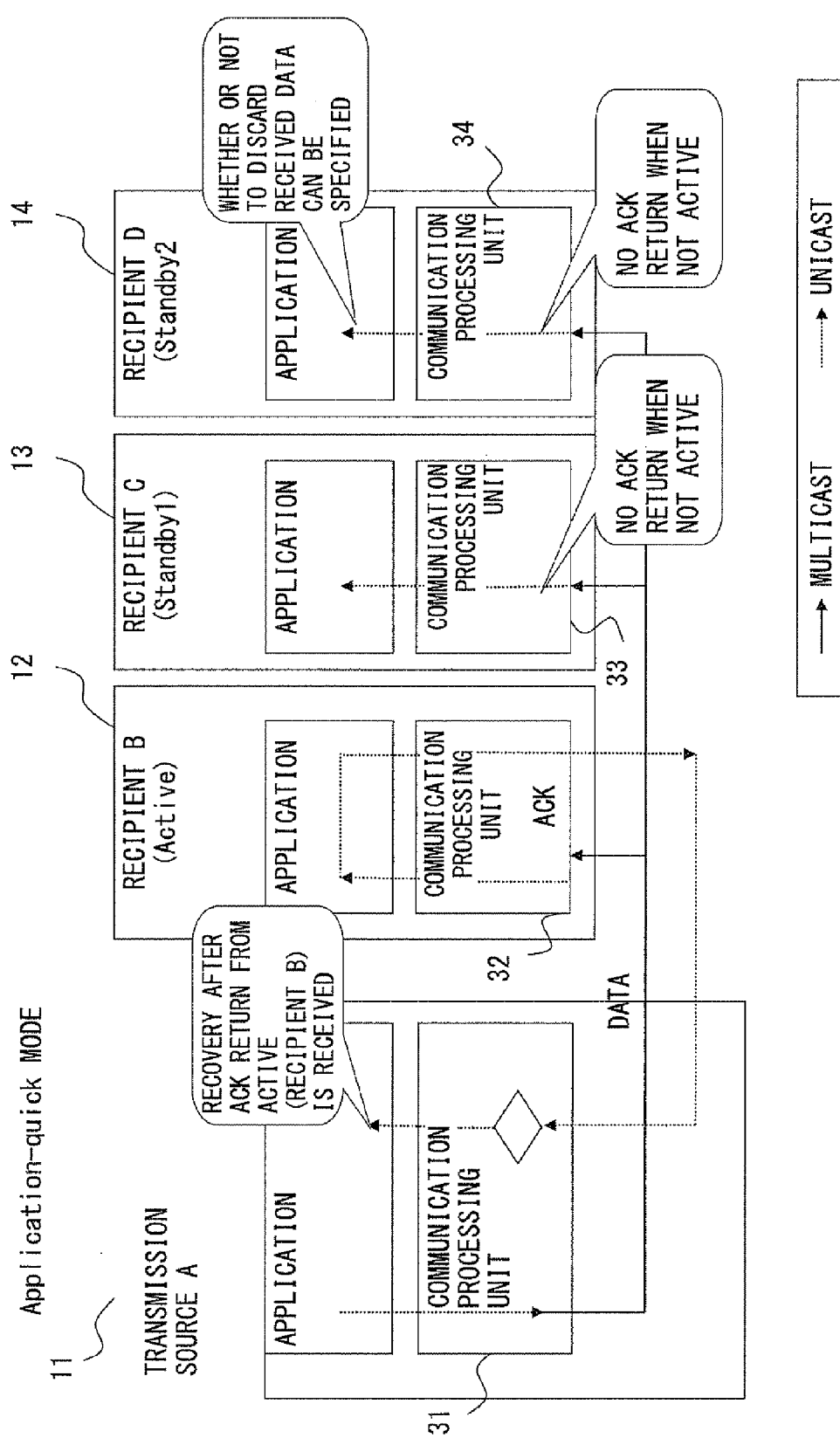
FIG. 22 is a description diagram of a delivery confirmation method in an application-quick mode.

Next, FIG. 22 is a description diagram of the delivery confirmation method in the application-quick mode. The application-quick mode is a mode in which only the ACTIVE device returns an ACK from the application layer.

The communication processing unit 31 of the client device 11 transmits a UDP packet to all the server devices 12-14 by multicast.

The communication processing unit 32 of the ACTIVE server device 12 compares the sequence number of a received packet and the sequence number of an already-received packet stored in the control table 41 to check whether or not there is a missing packet. When it is determined that there is no missing packet, the data of the packet is given to the application. The application instructs the communication processing unit 32 to return an ACK, after checking whether or not the data is normal. The communication processing unit 32 transmits an ACK by unicast to the client device 11. The server devices 13 and 14 are not ACTIVE, so they do not return an ACK.

The client device 11 performs another process after giving an ACK from the ACTIVE device to the application.

Figure 23:
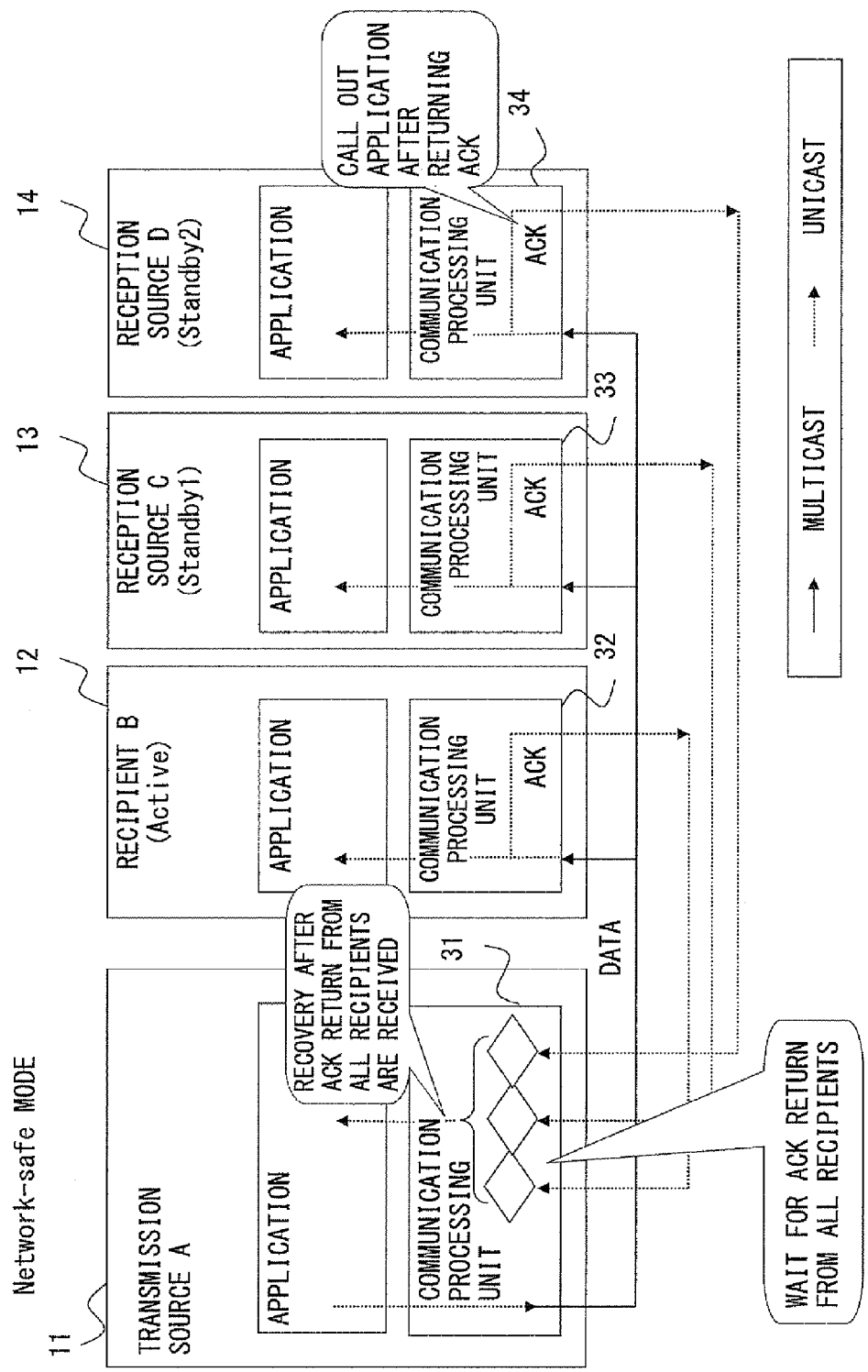
FIG. 23 is a description diagram of a delivery confirmation method in a network-safe mode.

Next, FIG. 23 is a description diagram of the delivery confirmation method in the network-safe mode. The network-safe mode is a mode in which all the server devices return an ACK from the network layer.

The communication processing unit 31 of the client device 11 transmits an UDP packet by multicast to all the servers 12-14.

The communication processing units 32-34 of the respective server devices 12-14 compares the sequence number of a received packet and the sequence number of an already-received packet stored in the control table 41 to check whether or not there is a missing packet. When it is determined that there is no missing packet, the respective communication processing units 32-34 return an ACK to the client device 11 by unicast. Meanwhile, when it is determined that there is a missing packet, a NACK requesting the retransmission of the packet having the missing sequence number is sent to the client device.

The client device waits for the ACK return from all the servers 12-14, and when an ACK is not returns within a certain time, retransmits the packet. When an ACK from all the server devices 12-14 has been received, the next process is performed.

Figure 24:
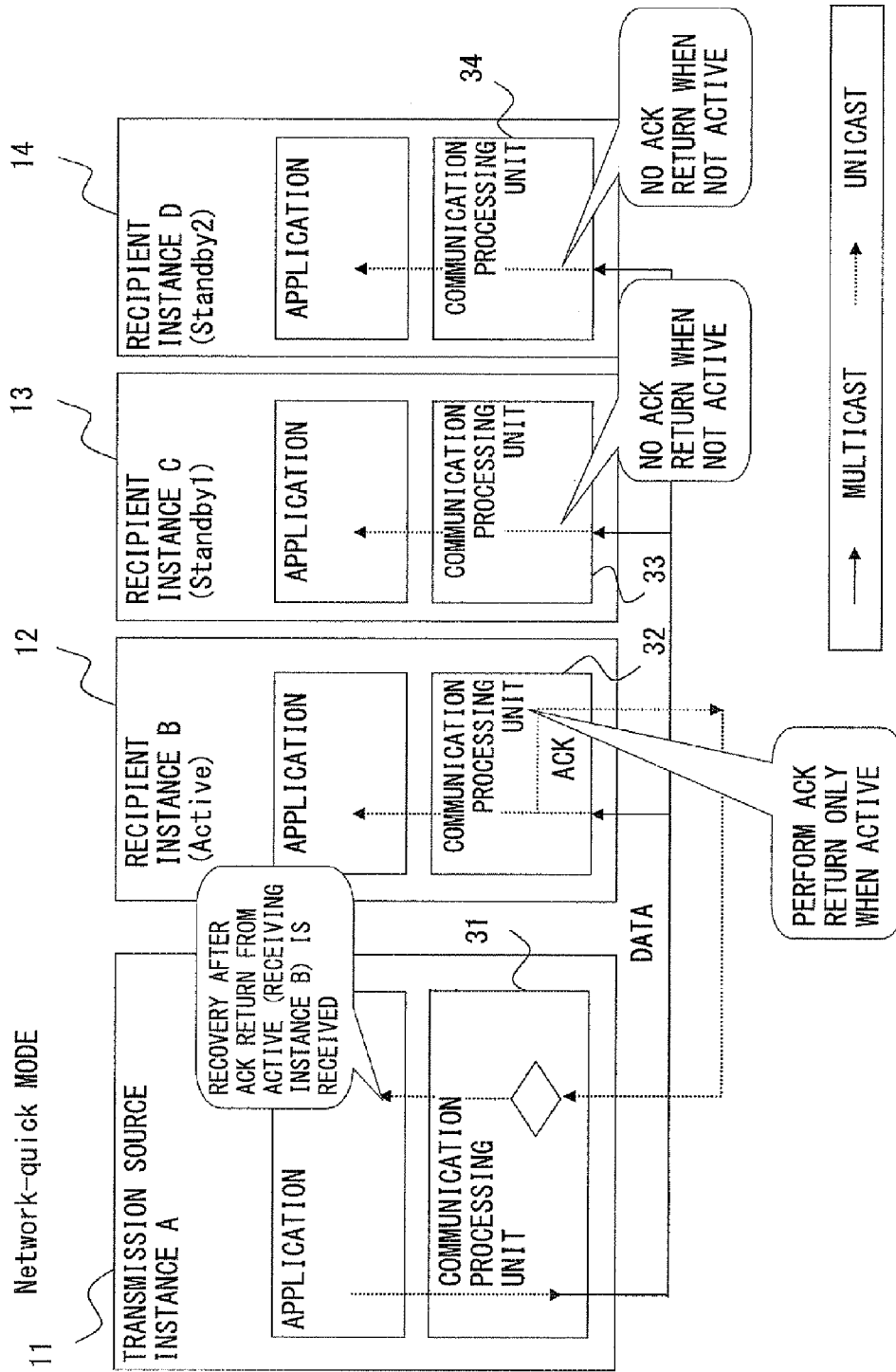
FIG. 24 is a description diagram of a delivery confirmation method in a network-quick mode.

Next, FIG. 24 is a description diagram of the delivery confirmation method in the network-quick mode. The network-quick mode is a mode in which only the ACTIVE server device 12 returns an ACK from the network layer.

The communication processing unit 31 of the client device 11 transmits an UDP packet by multicast to all the server devices 12-14.

The communication processing unit 32 of the ACTIVE server device 12 compares the sequence number of a received packet and the sequence number of an already-received packet stored in the control table 41 and checks whether or not there is a missing packet. When it is determined that there is no missing packet, the data of the packet is given to the application, and the communication processing unit 32 returns an ACK to the client device 11.

When the communication processing unit 31 of the client device 11 receives an ACK from the ACTIVE server 12, it performs the next process.

According to the communication method in the system including the client device 11 and the plurality of server devices 12-14 in the embodiment described above, the following effects can be obtained.

(a) By transmitting, by multicast, a UDP packet for which an initial value (for example, "1") is set as the sequence number from the client device 11 to the ACTIVE server device 12 and the STANDBY server devices 13-14, connection can be established between the client device 11 and the plurality of server devices 12-14 simultaneously.

(b) By sending, after the establishment of the connection, the data of the application of the client device 11 using a UDP device to the plurality of server devices 12-14 simultaneously and checking whether or not an ACK packet has been returned from the plurality of server devices, the delivery of the packet can be configured with both the ACTIVE device and the STANDBY device.

(c) Furthermore, when the server device detects a missing packet, information specifying the missing packet, for example, a NACK packet to which the missing sequence number is attached is returned to the client device 11, and the client device retransmits the UDP packet specified by the sequence number, thereby making it possible to secure the consistency of received data in all the server devices 12-14.

Since the communication is performed by the program (communication processing unit) implemented in the network layer on the basis of UDP in the communication method according to the embodiment, higher-speed transmission/reception of a packet can be realized, and the reliability equivalent to that of TCP can be secured. In addition, since the consistency between the application data both in the ACTIVE device 12 and STANDBY servers 13, 14 can be secured, even when a failure occurs in an ACTIVE server and switch to the STANDBY server device 13 or 14 takes place, the continuity of the communication between the application of the client device 11 and the application of the server device can be secured.

Therefore, it is preferable for a main system with which a high processing speed and high reliability are required, and also the discontinued time of the operation process in the event of a failure needs to be shortened.

(e) Since the programs (such as the communication processing units 31-34) that realize the communication method described above are implemented in the network layer, data communication with high reliability can be realized without changing the program of the individual application significantly.

The present invention is not limited to the above embodiment, and may be configured as follows.

(a) The format of a UDP packet is not limited to the configuration illustrated in FIG. 3. For example, when only one type of operation mode is used, there is no need for attaching MODE information to the UDP packet.

What is claimed is:

1. A communication method for a system including a client device and a plurality of server devices, the communication method comprising:
    establishing a connection between the client device and the plurality of server devices simultaneously by transmitting a first UDP packet to which a sequence number is attached from the client device to the plurality of server devices by multicast;
    after establishing the connection, attaching a subsequent sequence number to a second UDP packet including data of an application program and transmitting the second UDP packet from the client device to the plurality of server devices by multicast;
    storing a sequence number of an already-transmitted UDP packet in storage unit; and
    when an ACK packet in response to the transmitted UDP packet is returned from at least one or more of the plurality of server devices, comparing a sequence number attached to the ACK packet and the sequence number of the already-transmitted UDP packet that has been stored in the storage unit to confirm delivery of a UDP packet.

2. The communication method according to claim 1, wherein:
    the plurality of server devices respectively stores a sequence number of a received UDP packet;
    a sequence number of a newly received UDP packet and the sequence number of the received UDP packet that has been stored are compared to confirm delivery of a packet; and
    when the delivery of the UDP packet is confirmed, the respective server devices return, to the client device, the ACK packet to which the sequence number of the received UDP packet is attached as an ACK number.

3. The communication method according to claim 1, wherein:
    the plurality of server devices comprise active and standby server devices; and
    when a failure in an active one of the server devices is detected and a standby one of the servers is switched to active, the UDP packet is multicast to the plurality of server devices including the server device that has been switched to active, to maintain communication between an application program of the client device and an application program of the server device that has been switched to active.

4. The communication method according to claim 1, wherein the UDP packet is transmitted with FLAG information indicating whether a packet type is a data packet, an ACK packet or an NACK packet, a sequence number set as a consecutive number and an ACK number being attached to a header part of the UDP packet.

5. The communication method according to claim 1, wherein a NACK packet to which a sequence number of an undelivered UDP packet is transmitted to the client device, to request retransmission of the undelivered UDP packet.

6. The communication method according to claim 1, wherein information specifying either of an application mode in which a network layer returns the ACK packet in accordance with an instruction from an application program when the UDP packet is received or a network mode in which the ACK packet is returned according to a determination of the network layer when the UDP packet is received, is attached to a data part of the UDP packet.

7. A non-transitory computer readable medium recording a communication program for a system including a client device and a plurality of server devices, the communication program causing a computer to perform:
    establishing a connection between the client device and the plurality of server devices simultaneously by transmitting a first UDP packet to which a sequence number is attached from the client device to the plurality of server devices by multicast;
    attaching a subsequent sequence number to a second UDP packet including data of an application program and transmitting the second UDP packet from the client device to the plurality of server devices by multicast;
    storing a sequence number of an already-transmitted UDP packet in storage unit; and
    when an ACK packet in response to the transmitted UDP packet is returned from at least one or more of the plurality of server devices, comparing a sequence number attached to the ACK packet and the sequence number of the already-transmitted UDP packet that has been stored in the storage unit to confirm delivery of a UDP packet.

8. The non-transitory computer readable medium according to claim 7, wherein:
    the plurality of server devices comprise active and standby server devices; and
    when a failure in an active one of the server devices is detected and a standby one of the servers is switched to active, the UDP packet is multicast to the plurality of server devices including the server device that has been switched to active, to maintain communication between an application program of the client device and an application program of the server device that has been switched to active.

9. The non-transitory computer readable medium according to claim 7, wherein the UDP packet is transmitted with FLAG information indicating whether a packet type is a data packet, an ACK packet or an NACK packet, a sequence number set as a consecutive number and an ACK number being attached to a header part of the UDP packet.

10. The non-transitory computer readable medium according to claim 7, wherein when a NACK packet to which an ACK number indicating an undelivered packet is attached is received, a UDP packet specified by the ACK number is retransmitted.

* * * * *